(12) United States Patent
Zahavi et al.

(10) Patent No.: US 7,970,212 B2
(45) Date of Patent: Jun. 28, 2011

(54) METHOD FOR AUTOMATIC DETECTION AND CLASSIFICATION OF OBJECTS AND PATTERNS IN LOW RESOLUTION ENVIRONMENTS

(76) Inventors: Amir Zahavi, Petach Tikva (IL); Shai Nissim, Tel Aviv (IL)

( * ) Notice: Subject to any disclaimer, the term of this patent is extended or adjusted under 35 U.S.C. 154(b) by 657 days.

(21) Appl. No.: 12/096,025

(22) PCT Filed: Nov. 30, 2006

(86) PCT No.: PCT/IL2006/001384
§ 371 (c)(1),
(2), (4) Date: Jun. 4, 2008

(87) PCT Pub. No.: WO2007/066325
PCT Pub. Date: Jun. 14, 2007

(65) Prior Publication Data
US 2008/0285856 A1    Nov. 20, 2008

(30) Foreign Application Priority Data

Dec. 8, 2005   (IL) .......................................... 172480

(51) Int. Cl.
*G06K 9/46*   (2006.01)
*G06K 9/66*   (2006.01)
*G06K 9/62*   (2006.01)
(52) U.S. Cl. ......... 382/207; 382/195; 382/224; 382/277
(58) Field of Classification Search .................. 382/173, 382/190, 195, 207, 224, 240, 276, 277
See application file for complete search history.

(56) References Cited

U.S. PATENT DOCUMENTS
7,043,075 B2   5/2006   Gutta

OTHER PUBLICATIONS

Second European Office Action for parallel application 06821604.3 dated Sep. 30, 2009.
Phuvan S. et al; "Optoelectronic Fractal Scanning Technique for Wavelet Transform and Neural Net Pattern Classifiers"; Proceedings of the International Joint Conference on Neural Networks, Baltimore Jun. 7-11, 1992; vol. 3, pp. 40-46; IEEE New York, N.Y.
Murroni M. et al; "Region-based Image Coding for Remote Sensing"; Image Processing and Its Applications, 1999, Seventh International Conference; Jul. 1999 vol. 2 pp. 808-812, IEEE London, U.K.

(Continued)

*Primary Examiner* — John B Strege
(74) *Attorney, Agent, or Firm* — Simon Kahn

(57) ABSTRACT

The invention is a method of using Wavelet Transformation and Artificial Neural Network (ANN) systems for automatic detecting and classifying objects. To train the system in object recognition different images, which usually contain desired objects alongside other objects are used. These objects may appear at different angles. Different characteristics regarding the objects are extracted from the images and stored in a data bank. The system then determines the extent to which each inserted characteristic will be useful in future recognition and determines its relative weight. After the initial insertion of data, the operator tests the system with a set of new images, some of which contain the class objects and some of which contain similar and/or dissimilar objects of different classification. The system learns from the images containing similar objects of different classes as well as from the images containing the class objects, since each specific class characteristic needs to be set apart from other class characteristic. The system may be tested and trained again and again until the operator is satisfied with the system's success rate of object recognition and classification.

21 Claims, 25 Drawing Sheets

OTHER PUBLICATIONS

Lamarque, C-H et al; "Image Analysis Using Space-Filling Curves and 1D Wavelet Bases"; Pattern Recognition, Aug. 1997, vol. 29, No. 8, pp. 1309-1322, Elsevier, Kidlington, Great Britain.

Ewa Skubalska-Rafajlowicz; "Pattern Recognition Algorithm Based on Space Filling Curves and Orthogonal Expansions"; IEEE Transactions on Information Theory; Jul. 2001, vol. 47, No. 5, pp. 1915-1927; New York.

Ebrahim, Y. et al; "Shape Representation and Matching of 3D Objects for Computer Vision Applications"; WSEAS Transactions on Information Science and Applications; vol. 2, No. 9, Sep. 2005; Corlu, Greece.

Michel, Misiti et al; "Les Ondelettes et Leurs Applications: 5.2.2. Applicataion a la Detection De Formes"; Hermes Science Publications, pp. 141-148; 2003; Paris.

Michel, Misiti et al; "8. Traitement D'image Par Ondelettes: Les Ondelettes et Leurs Applications"; Hermes Science Publications, pp. 247-258; 2003; Paris.

Gonzalez R. C. et al; "Digital Image Processing: Introduction"; Prentice Hall, 2002; pp. 1-33; 527, 653; Upper Saddle River, N.J.

Israel Patent Office First Office Action Dated Jan. 6, 2010—parallel case 172480.

European Patent Office Invitation to Attend Oral Proceedings in Parallel European Patent Case 06821604.3, dated Sep. 6, 2010.

$$A(i,j) = \begin{bmatrix} 0 & 0 & 0 & 0 & 5 & 0 & 0 & 0 & 0 & 0 \\ 7 & 0 & 7 & 0 & 5 & 0 & 2 & 0 & 2 & 0 \\ 0 & 7 & 0 & 0 & 0 & 0 & 2 & 2 & 0 & 0 \\ 0 & 7 & 7 & 0 & 3 & 0 & 2 & 2 & 0 & 0 \\ 0 & 0 & 7 & 0 & 3 & 0 & 0 & 0 & 0 & 0 \\ 0 & 0 & 0 & 0 & 3 & 0 & 0 & 0 & 0 & 0 \\ 0 & 6 & 6 & 0 & 3 & 0 & 1 & 1 & 0 & 0 \\ 0 & 6 & 6 & 0 & 0 & 0 & 1 & 1 & 0 & 0 \\ 0 & 6 & 6 & 0 & 4 & 0 & 0 & 1 & 1 & 0 \\ 0 & 0 & 0 & 0 & 4 & 0 & 0 & 0 & 0 & 0 \end{bmatrix}$$

Fig. 5

Result – Object Detection

METHOD FOR AUTOMATIC DETECTION AND CLASSIFICATION OF OBJECTS AND PATTERNS IN LOW RESOLUTION ENVIRONMENTS

CROSS-REFERENCE TO RELATED APPLICATIONS

This application is a National Phase of PCT Patent Application No. PCT/IL2006/001384 having an International Filing Date of Nov. 30, 2006, which claims the benefit of Israel Patent Application S/N 172480 filed Dec. 8, 2005.

FIELD OF THE INVENTION

The present invention relates to the field of data processing. More particularly, the invention relates to a method for detection and classification of objects or patterns located in low resolution environments, by extracting and comparing distinct characteristics.

BACKGROUND OF THE INVENTION

In recent years, the use of digital imaging, where an image is represented as an array of digital values, has increased dramatically both in industrial implementations and in everyday popular devices ranging from simple cameras to television broadcasting. Although the technology of digital imaging has been known in the art for a long time, major technological advancements in the art have made digital images easier to process, store and transmit.

The method for using hardware and/or software to automatically detect and classify objects in images is referred to hereinafter as object recognition, where an object may be any physical or non physical entity with a certain texture in the image. A physical entity may be understood as an object that has a measurable volume such as a ball, building, vehicle, animal, etc. whereas the non physical entities such as patterns, colors, or sequences do not have a measurable volume. The problem of automatic object recognition is coping with many variations that a single object may have. For example, a vehicle may have different visual variations. It may be imaged from different angles, where in each angle the vehicle appears differently. The car may also be imaged in different sizes or in different colors. Furthermore, many models of cars exist with major differences in appearance ranging from different outlines of the silhouette to different details of headlights, grill, and windows. Another example is the human image of different people which varies in sizes, shapes, shades, angles, and positions, a fact that increases the difficulty of object recognition even further. The human image may belong to an old man or a young boy, short or tall, dark or bright, etc. The image may show a human standing, sitting or running where different details like leg position vary drastically.

Another problem of object recognition arises from the quality of the acquired image. Some of the digital images are blurred or cluttered in a way that the contrast between objects in the image is not easily distinguishable. A good example may be a photograph taken by a low resolution camera, or in bad lighting conditions. The same problem may arise for an object pictured in an environment having similar color and shade such as a white plate on a white table cloth. Another example may be found in the area of medical photography, where the low resolution of an X-ray image is a result of limited radiation.

Many computer-based methods for object recognition use databases for profiling objects, and statistical modeling to represent the variability of the objects, whereas the statistical modeling helps describe a quantity that is not fixed or deterministic. These methods use the versatility of statistics to enhance the profile of an image for improving the chances of recognizing it in different positions. However, these methods rely on strong computational capabilities of the performing computer as the statistical calculations involved are complicated and consume many resources.

U.S. Pat. No. 6,829,384 describes a method for detecting the presence of 3-d objects in a 2-d image. The method utilizes a pre-selected number of detectors that are trained on sample images prior to operating on a given input image. The method discloses an exhaustive object search of different positions and scales in accordance with a detection strategy. The method described within uses quantized wavelet coefficients at different locations on the input image together with using pre-computed likelihood table to determine object presence. The publication discloses the statistical model the method uses, which relies on complex calculations and vast computational capabilities.

U.S. Pat. No. 6,421,463 describes a trainable system for detecting objects in images. The system is capable of detecting objects with variability in size, shape, color and texture without relying on any a priori models. The invention utilizes a wavelet template that defines the shape of an object in terms of a subset of wavelet coefficients of the image. A classifier used with an image database for object recognition, is described in the patent. The method of the invention detects an object by iteratively resizing the image to achieve multi-scale detection. Nevertheless, the system described in the patent lacks the ability to recognize objects in low resolution images.

It is an object of the present invention to provide a method for automatic detection and classification of objects in low resolution images, including objects which may be undetectable by a human eye.

It is another object of the present invention to provide a method for automatic detection and classification of objects in low resolution images in such scenarios where human presence may be dangerous and unadvisable.

It is still another object of the present invention to provide a method for automatic detection and classification of objects in low resolution images, in order to replace humans and achieve higher efficiency in the process.

It is still another object of the present invention to provide a method for a trainable system capable of learning object characteristics from images.

It is still another object of the present invention to provide a method that utilizes a fast algorithm for receiving results in real time.

It is still another object of the present invention to provide a method capable of detecting and classifying objects in multi dimensional environments.

Other objects and advantages of the invention will become apparent as the description proceeds.

SUMMARY OF THE INVENTION

The present invention relates to a method for automatic detecting and classifying objects comprising the steps of: (a) providing an original image comprising one or more objects; (b) creating a new image of each of said objects isolated from all other features of said original image by performing a process of image separation; (c) transforming at least one of said new images of said isolated object into a vector using rearrangement and/or shifting, where said vector contains information of said isolated object; (d) applying a 1 Dimensional Continuous Wavelet Transform to said vector; (e) extracting at least one feature from said 1 Dimensional Continuous Wavelet Transform containing information on the scale and coefficient ranges of said isolated object; (f) storing features, said geometric characteristics extracted from isolated object along with said scales and said coefficients, in a feature vector, where said features are unique characteristics of the isolated object; and (g) comparing said feature vector to at least one other feature vector from a data base.

Preferably, the process of image separation comprises: (a) applying, at least once, a 2 Dimensional Discrete Wavelet Transform to the original image; (b) detecting edges of at least one object and/or providing a threshold to detect objects; (c) producing a contrast image where at least one said object pixels have a different value from background pixels; (d) refining said contrast image by eliminating isolated pixels. (e) assigning an individual value to each said object, where said object pixels are assigned said individual value; and (f) producing a new image for each said object, containing said object and background;

Preferably, the process of image separation further comprises the step of extracting geometrical characteristics of the object from the new image and storing said geometrical characteristics in the feature vector;

Preferably, the process of image separation further comprises the step of reducing the resolution of new image;

Preferably, the object is a pattern in an image.

Preferably, the extracted features are stored in a feature vector, and said feature vector is used to classify the object.

Preferably, the original image is a 2 dimensional image.

Preferably, the original image has more than 2 dimensions.

Preferably, the extracted features are wavelet scale values, wavelet coefficients, and/or geometrical characteristics.

Preferably, the 2 Dimensional Discrete Wavelet Transform is applied in order to derive the approximation coefficient matrix obtained by the wavelet decomposition of the original image and/or the reconstruction matrix of said coefficients.

Preferably, the 2 Dimensional Discrete Wavelet Transform is applied in order to derive the vertical, horizontal, and/or diagonal detail coefficients matrix of the original image and/or the reconstruction matrix of said coefficients.

Preferably, the 2 Dimensional Discrete Wavelet Transform is a combination of applying said transform in order to derive the approximation coefficients matrix, detail coefficient matrixes (vertical, horizontal, and diagonal) of the original image and/or the reconstruction matrixes of said coefficients.

Preferably, the 2 Dimensional Discrete Wavelet Transform is applied in "slices" to a multi dimensional original image.

Preferably, the erasing used is a partial erasing.

Preferably, the Wavelet used in the Wavelet Transform may belong to any one of the known Mother Wavelets or a newly created Mother Wavelet.

Preferably, the rearrangement used is a partial rearrangement.

Preferably, the new image contains the original object pixels from the original image.

Preferably, the comparing of the feature vector to at least one other feature vector is done by an Artificial Neural Network.

BRIEF DESCRIPTION OF THE DRAWINGS

In the drawings:

FIG. 5 is a 2-D matrix generally illustrating an example of a 2-D image, after object separation, according to one of the embodiments.

DETAILED DESCRIPTION OF PREFERRED EMBODIMENTS

Figure 1A:
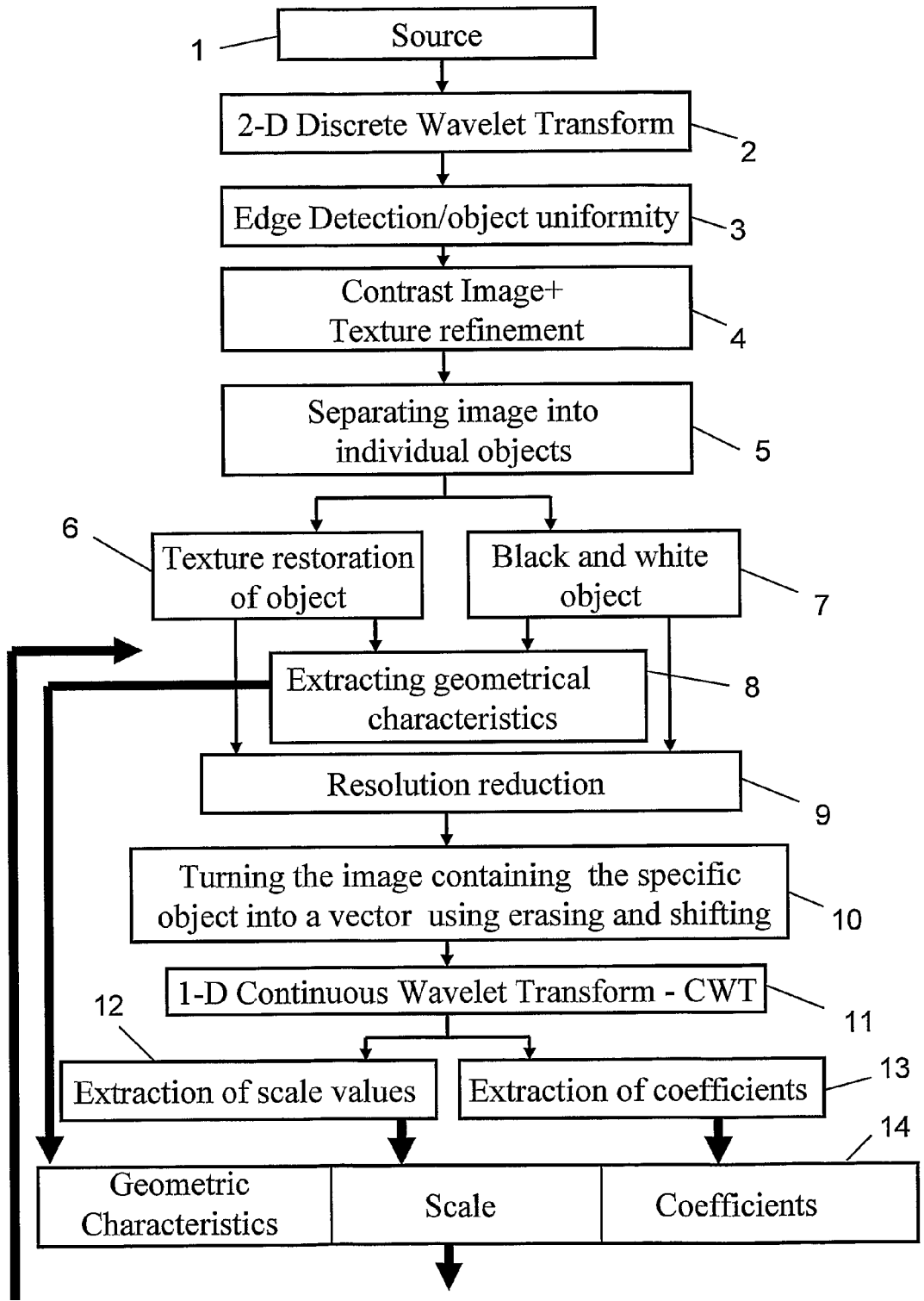
FIG. 1a is a flow chart generally illustrating the method of the invention.
Figure 1A:
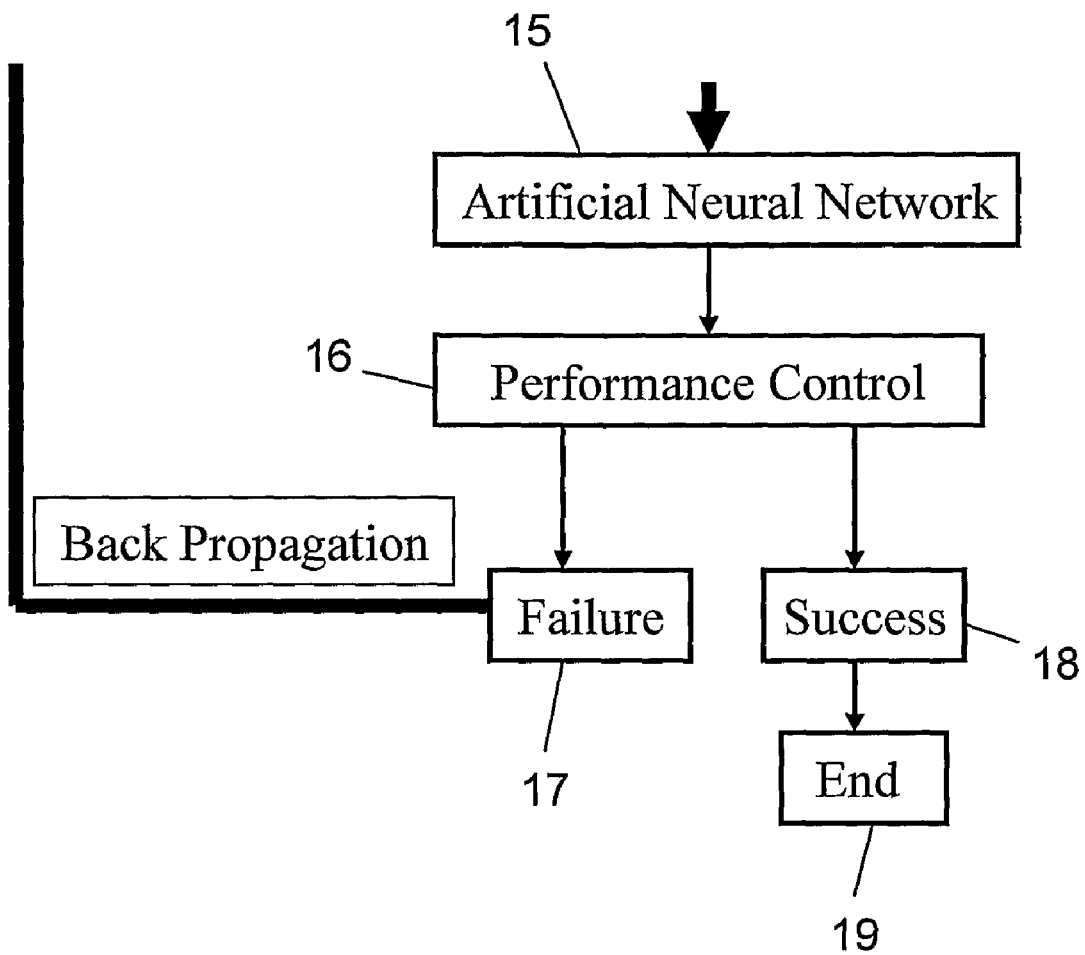

For the sake of brevity the following terms are defined explicitly:

Classification of an object means identifying an object as belonging to a certain group.

An operator is a person controlling or testing the system.

The weight is the relative importance or relative influence of input characteristics determined by an Artificial Neural Network.

Back Propagation refers to returning to previous steps in a process.

The frequency (f) refers to the pace of sample in an image, where the equation: f~1/dist (Euclidian distance) teaches that increment in the "distance" between the samples (dist) decreases the frequency and vice versa. In general, low frequency terms usually represent the general shape of the object in the image and the high frequency terms usually represent the edges and fine details.

The term scale describes the measure of frequency.

Coefficients are products of the 1D or 2D wavelet transform. Coefficients are divided into two categories: detail coefficients and approximation coefficients.

Approximation Coefficients are low frequency elements resulting from the 1D or 2D wavelet transform. Though the wavelet transform operates on the entire source, the approximation coefficients correlate to the low frequency elements of the source, as defined by the chosen wavelet function.

Detail Coefficients are high frequency elements resulting from the 1D or 2D wavelet transform. Though the wavelet transform operates on the entire source, the detail coefficients correlate to the high frequency elements of the source, as defined by the chosen wavelet function.

Decomposition is the processing of an image or sequence at some level of resolution and generating the approximation and detail coefficients at lower levels of resolution through filtering and down sampling (decimation) of the image or sequence.

Reconstruction is the reverse process of decomposition which involves combining the lower level approximation and detail coefficients to yield the detail and approximation coefficients at a finer resolution. The process may be performed by digital filtering as well.

A digital image consists of a two dimensional array of "picture elements" referred to as "pixels". Each pixel is represented by a binary number (i.e. digital value) representing the shade and color of a portion of the image, in accordance with the selected representation method. For example, a pixel of 1 byte may be used in a black and white image, wherein the value of the byte represents the shade of the pixel. An image such as a photograph can be represented by an array of pixels, where each pixel represents a small fragment of the photograph, and is stored in a digital storage device such as a disk, or transmitted via digital communication means such as the Internet. Furthermore, since the image is a 2 dimensional (2-D) array of digital values it may be digitally and mathematically processed as a 2-D matrix.

The invention may be better understood by the following non-limitative example where the system is tested for recognition and classification of aircraft as objects. Prior to applying the proposed method the ANN system is fed with numerous feature vectors of aircraft and other objects, for determining the weights of the common characteristics of different objects. The "feature vector" will be explained herein below with reference to step 14 of FIG. 1a. The operator defines which feature vectors relate to the desired object, in this case aircraft, and which feature vectors relate to other types of objects. It should be mentioned that it is possible to distinguish between a number of different desired objects as well, such as different models of aircraft. In the next step, the ANN is tested with more feature vectors retrieved from new images in order to determine the success rate of the system. After a thorough process of training on aircraft detection, the system is ready for testing the method with a new image containing aircraft. The selected image, for this example, is shown in FIG. 2a where 4 aircraft are shown, each in a different position. In addition, other objects such as balls and rectangles have been added to the image for comparison and testing. In this example, all the aircraft have common characteristics and certain geometrical features, in contrast to the rectangle and balls.

Figure 2A:
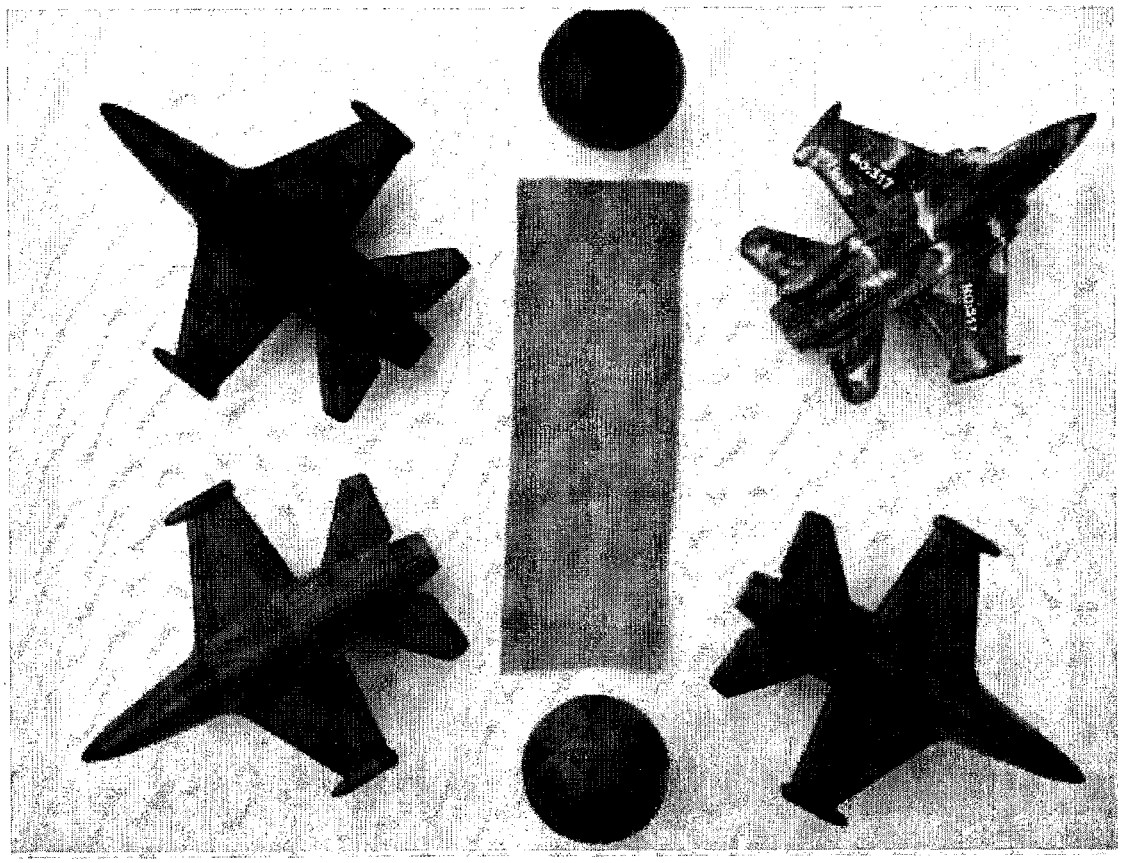
FIG. 2a is a general example of a source image in one of the embodiments, where the desired objects may appear in different orientation, quality, size, background etc.
Figure 2B:
FIG. 2b is a general example of a source image in another embodiment.
Figure 2C:
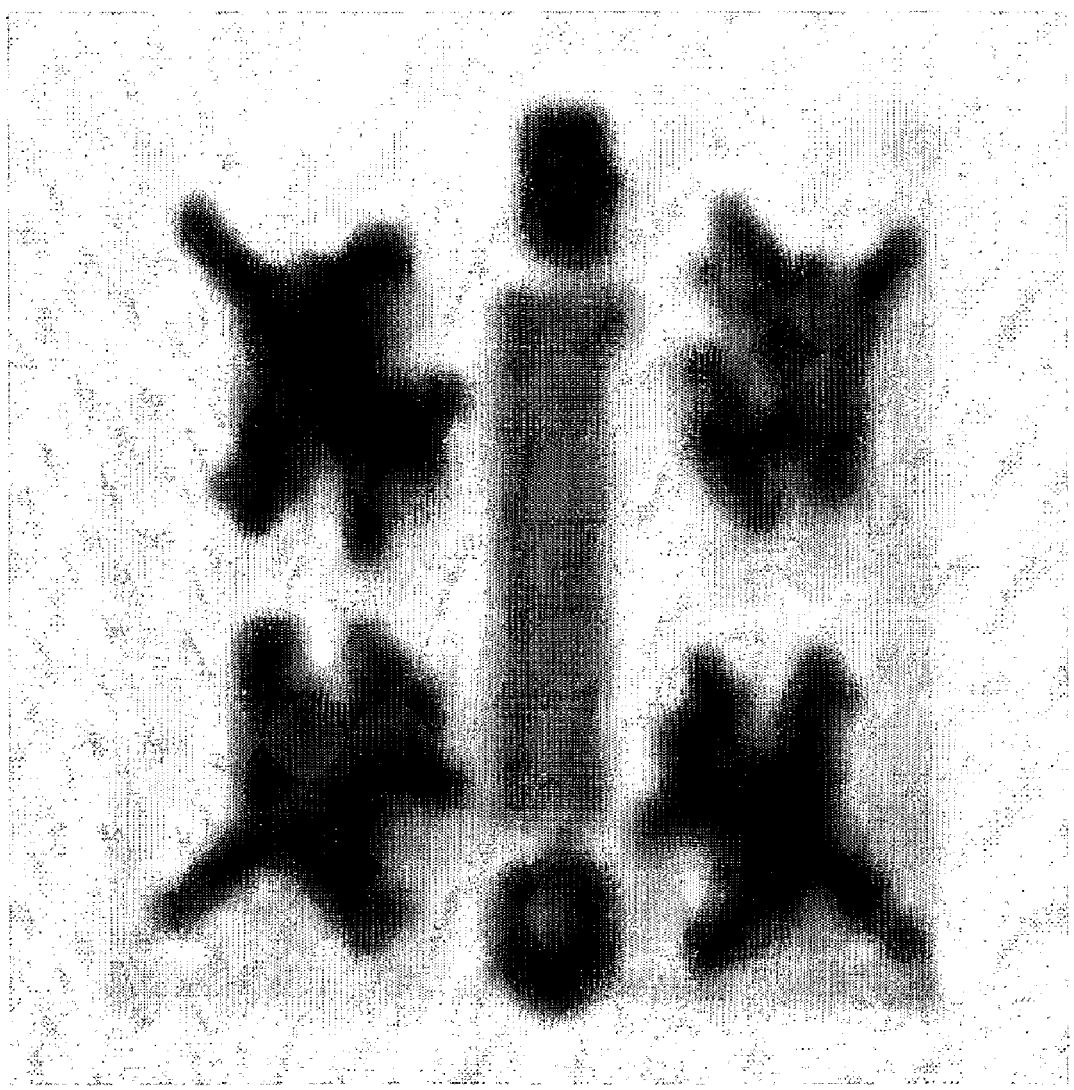
FIG. 2c is a general example of a source image in another embodiment.

FIG. 1a is a flow chart generally illustrating an embodiment of the method of the invention for automatic object recognition, detection and classification. In step 1 an image or a digital source is fed to the system. The image's resolution may be low as a result of imaging in harsh visual conditions or as a result of an intentional reduction of quality and resolution in the image for faster and/or real time processing. Referring to the example, FIG. 2b shows the reduced resolution (30×30) image of FIG. 2a resolution (480×640). Each group of pixels in FIG. 2a is represented by one pixel in FIG. 2b, which is a result of the nearest-neighbor interpolation of the pixels in each group in FIG. 2a. Other methods may also be applied for this purpose. FIG. 2b simulates a photograph taken by a scout plane or by a satellite, FIG. 2c simulates another source image photographed out of focus. It should be noted that for the sake of brevity and clear observation, FIGS. 3 to 8, which illustrating the successive steps of the method, are products of processing the image of FIG. 2a with the initial resolution instead of processing the images of FIG. 2b-c. Nevertheless, the method can be applied to low resolution images as well, similar to the ones shown in FIG. 2b-c.

Figure 1B:
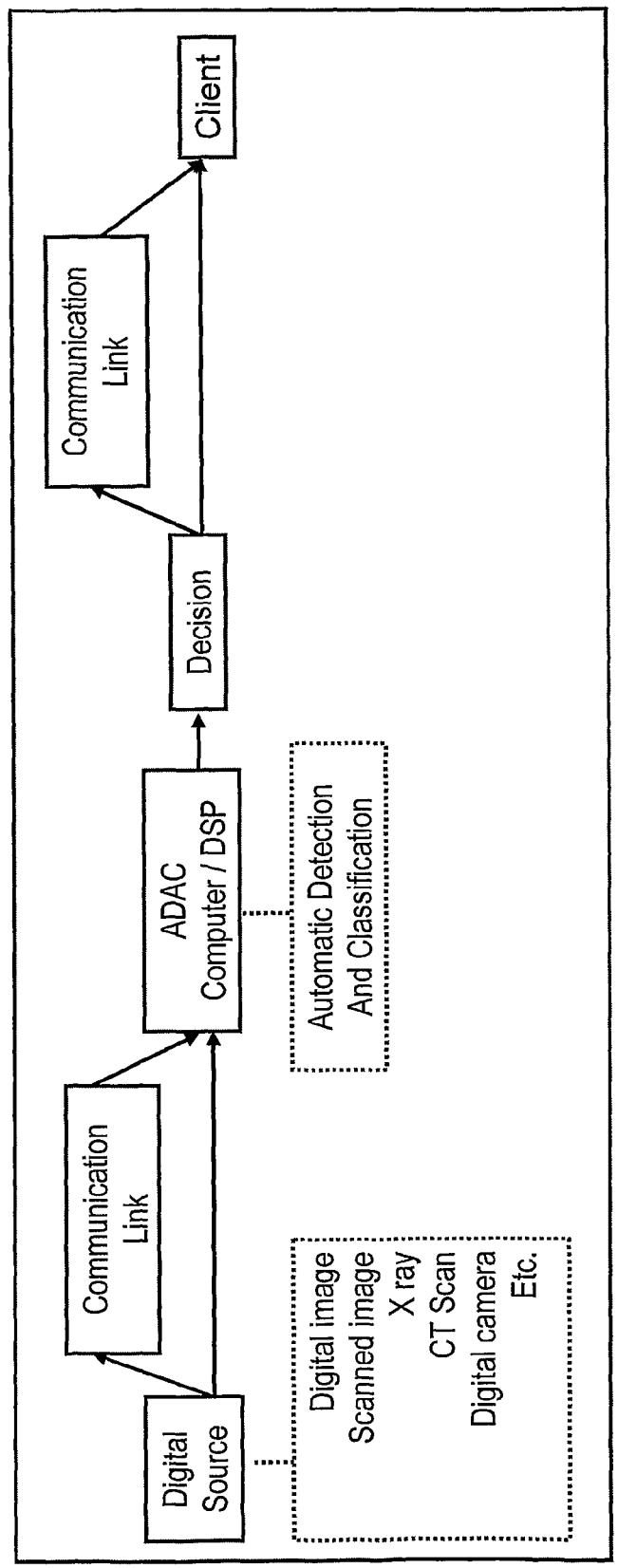
FIG. 1b is a scheme generally illustrating the process of the invention.

FIG. 1b is a schematic block diagram generally illustrating the hardware blocks used to execute the process of the invention The following steps 2 to 7 in FIG. 1a describe an embodiment of the process for image object separation. These steps may be carried out in other ways, or by other known processes for object separation, as described for example in "Wavelet Transforms", Wavelet based Mallat and Hwang 1992, page 192.

In FIG. 1a step 2, a 2-Dimensional Discrete Wavelet Transform (2D-DWT) is applied to the source image. This transform is used for filtering of the original image. The 2D-DWT can be considered as a filter bank, which separates the low frequency approximation coefficients and the high frequency detail coefficients. The detail coefficients consist of vertical, horizontal and diagonal coefficient matrixes which are products of performing a 2D-DWT on vertical, horizontal and diagonal vectors of the source image separately. The approximation and detail coefficient matrixes of the 2D-DWT are used for edge detection and object separation.

Figure 3A:
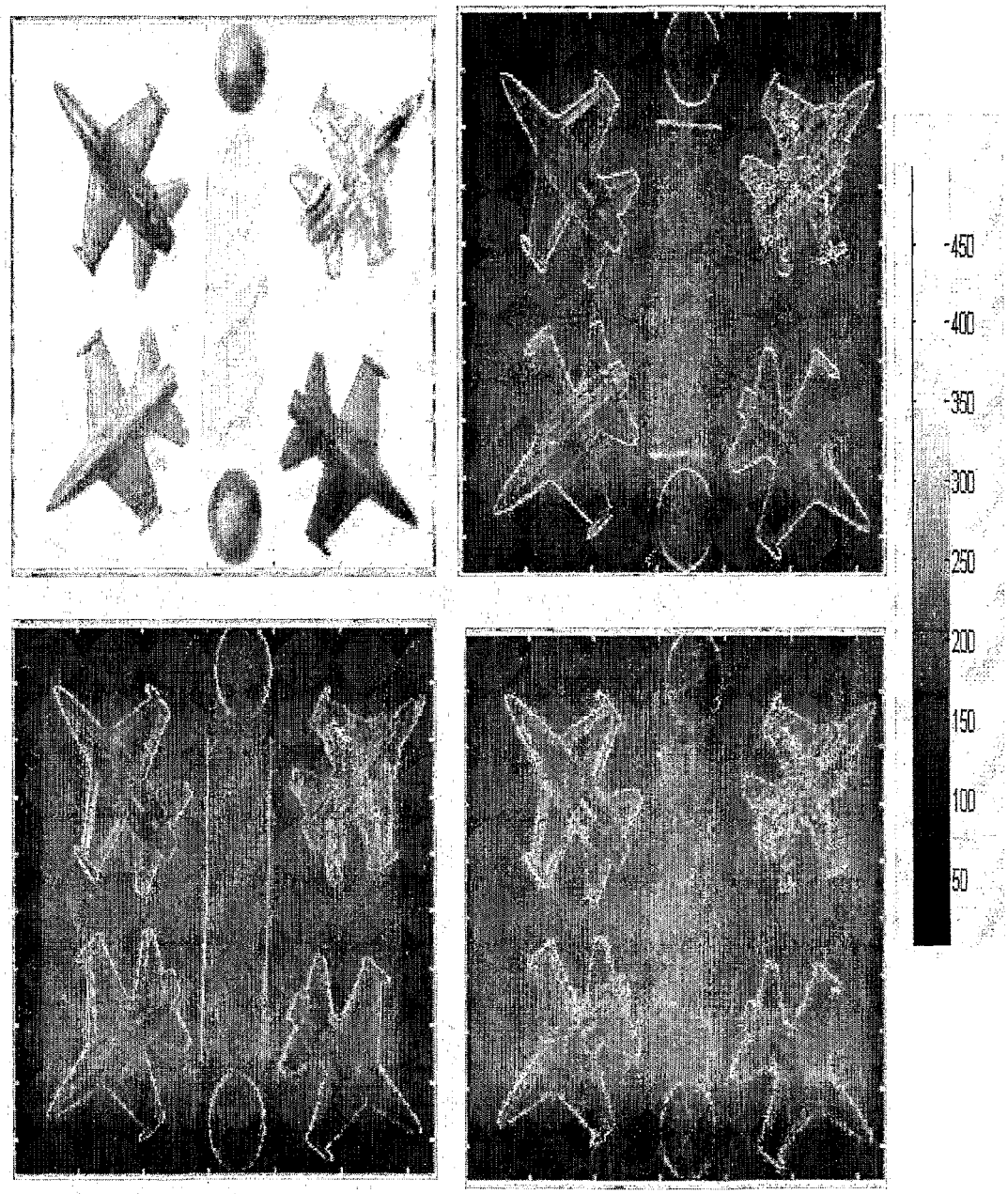
FIG. 3a is a visual representation of approximation coefficients and detail coefficients (vertical, horizontal and diagonal) derived from a 2-D Discreet Wavelet Transform performed on source image, according to one of the embodiments.
Figure 3B:
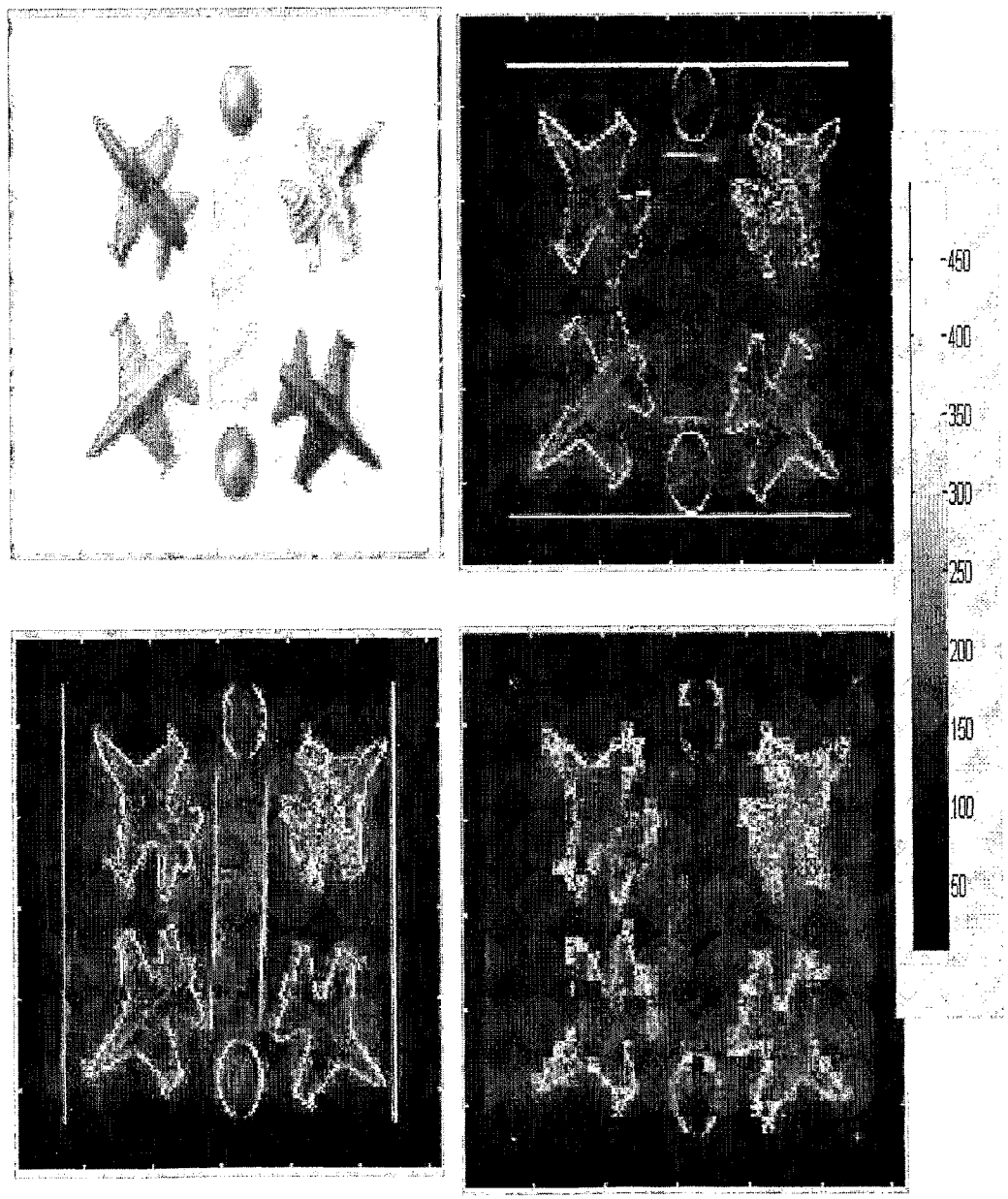
FIG. 3b is a visual representation of a reconstruction from 2D Discreet Wavelet Transform 2 level approximation coefficients and detail coefficients derived from a 2-D Discreet Wavelet Transform performed on source image, according to one of the embodiments.

FIGS. 3a and 3b are images visually representing the coefficients derived from the 2D-DWT applied to the image of FIG. 2a, and their reconstruction (step 3 of FIG. 1a). As can be seen, all pixels in the background receive similar coefficients whereas the pixels of the objects receive varying coefficients in accordance to the shape of the object. In this manner it is possible to differentiate the objects from their environment and from other neighboring objects. It should be mentioned that the same procedure is applied even in such cases where the background's texture may be more complex. FIG. 3a visually illustrates the approximation coefficients and detail coefficients; vertical, horizontal and diagonal, derived from a 2D-DWT performed on vertical, horizontal and diagonal vectors of the source image respectively. In FIG. 3a the top left image visually represents the approximation coefficients, the top right image visually represents the horizontal detail coefficients, the bottom left image visually represents the vertical detail coefficients, and the bottom right image visually represents the diagonal detail coefficients. FIG. 3a illustrates the coefficients in a discrete (non continuous) manner, whereas FIG. 3b visually illustrates the reconstruction of the approximation and detail coefficients illustrated in FIG. 3a. As shown in FIGS. 3a and 3b, detection of coefficients representing object edges is fairly simple in this example. In FIG. 3b, the top left image visually represents the reconstruction of the approximation coefficients, the top right image visually represents the reconstruction of the horizontal detail coefficients, the bottom left image visually represents the reconstruction of the vertical detail coefficients, and the bottom right image visually represents the reconstruction of the diagonal detail coefficients. The gray scale to the right of the illustration is a comparison key showing the value of the coefficients as represented in the illustration. It should be noted that for multi dimensional sources the 2D-DWT may be applied in 2D "slices".

In step 3 of FIG. 1a, the extracted approximation and detail coefficients of the 2D-DWT, derived from step 2, are reconstructed if necessary. In the following method, both detail and approximation coefficients may be used. The detail coefficients and their reconstruction, if performed, result in a filtered image where the low frequency approximation coefficients have already been omitted, causing the object's edges to be more prominent. The filtered image is then processed for detecting the object's edges. The detail coefficients of WT, related to the image pixels, have higher values at points where abrupt changes of pattern occur, for example, at the object's edges. The approximation coefficients and their reconstruction, if performed, result in a filtered image where the high frequency detail coefficients have already been omitted, causing each object's colors to be more uniform. This uniformity is achieved due to the fact that the higher frequency details have been omitted from the picture and only the general information regarding the picture remains. This aids in determining the appropriate threshold to separate the entire object from the background. To complete the task of detecting the objects and their edges, a certain threshold is determined for all approximation or detail coefficients or their reconstruction. The coefficients within the required threshold region are assumed to represent pixels of object edges and the objects themselves, and are processed accordingly. The threshold may be enlarged or reduced by the operator in accordance with the image processed and the desired results. It should be mentioned that any other method for edge detection such as the "Sobel Filter" or "Canny Filter" may be used for this purpose. The procedure provided in this application is non limitative and other methods may be used.

Figure 4A:
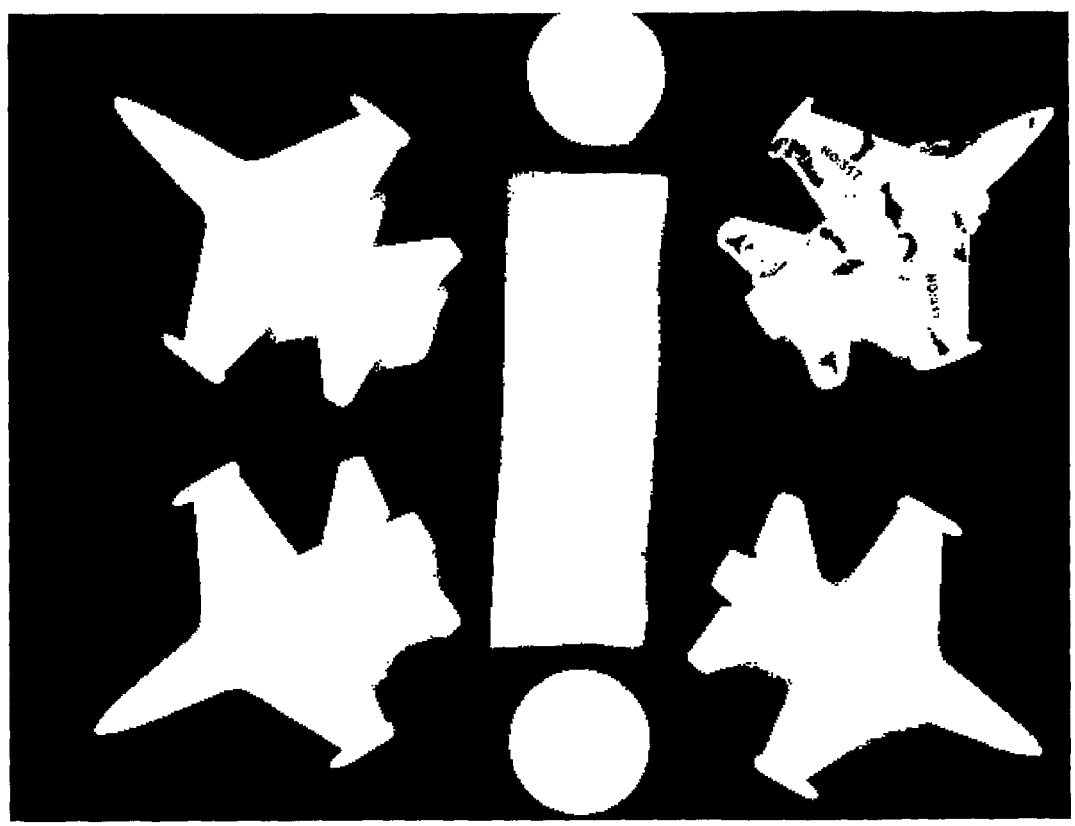
FIG. 4a illustrates a contrast image, processed from source image, according to one of the embodiments.
Figure 4B:
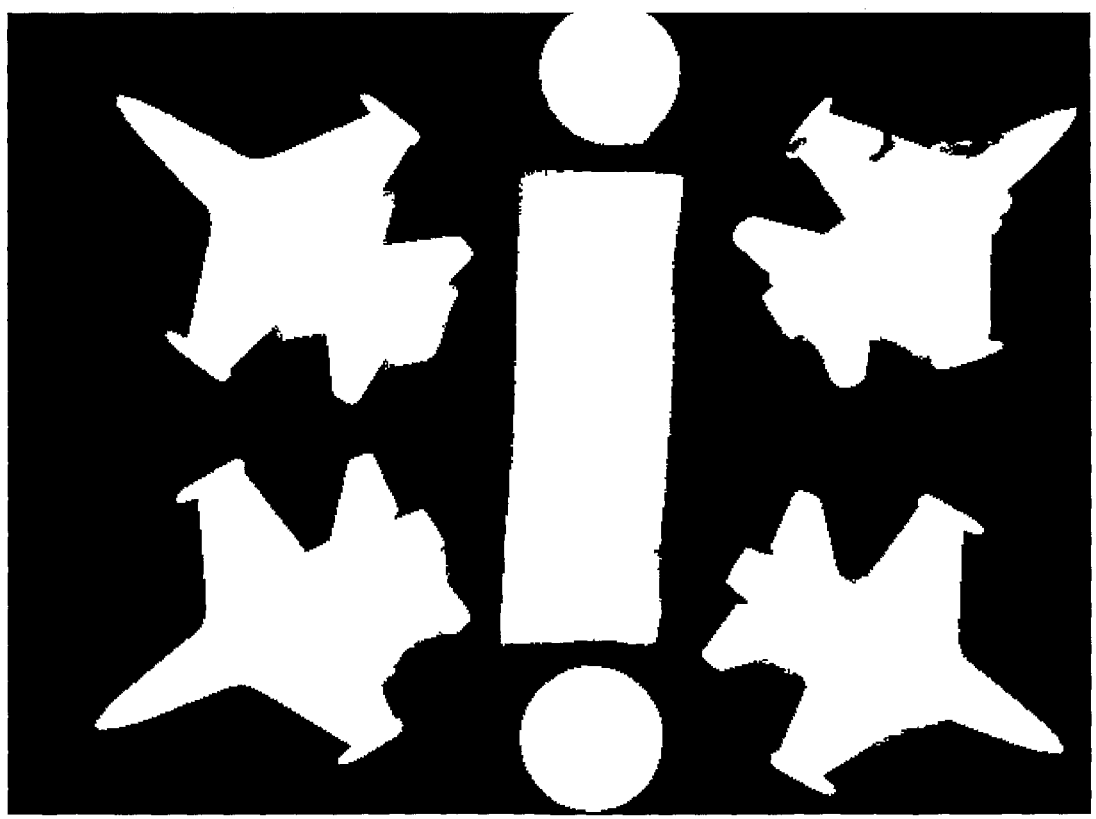
FIG. 4b illustrates a contrast image, after texture refinement, processed from source image, according to one of the embodiments.

In FIG. 1a step 4 the original digital image (FIG. 2a) has been converted into a contrast image using the object's edges found in the previous step. The pixels located within the perimeters of the chosen threshold range are given a certain value (and are referred to hereinafter as object pixels) whereas the outer pixels are given a different value (and are referred to hereinafter as background pixels). In one of the embodiments the background pixels receive a value of 0 (which appears black on a screen) and the object pixels receive a value of 255 (which appears white on a screen). FIG. 4a illustrates a contrast image received in step 4 of the method. As can be seen in FIG. 4a all objects are white whereas the background is black. The contrast image is refined by converting the value of isolated pixels, which may be single pixels or small groups of pixels, to match the value of surrounding pixels as shown in FIG. 4b. For example see the image of the aircraft in the upper right corner of FIG. 4a and FIG. 4b. At this point the contrast image shows a clear distinction between the objects and the background in the image as can be seen in FIG. 4b.

In step 5 each object in the contrast image of FIG. 4b is assigned an individual value, where all pixels forming the object are assigned said value. The resulting image contains a background, where all its pixels have the same value, and a number of objects, each containing a distinct value. The pixels of each object have the same value, where the value varies from object to object. At this point the image shows a background of uniform pixel value and n objects, each having a different and distinct pixel values, where n=1, 2, 3, . . . . Although step 5 of the process is performed on a full contrast image, for the sake of brevity, a simplified and smaller matrix is shown in FIG. 5 for illustrating a model of a matrix. Each object's pixels (n=7 objects) have been given an individual value to represent the specific object, and the background has been given the value of 0.

Figure 6:
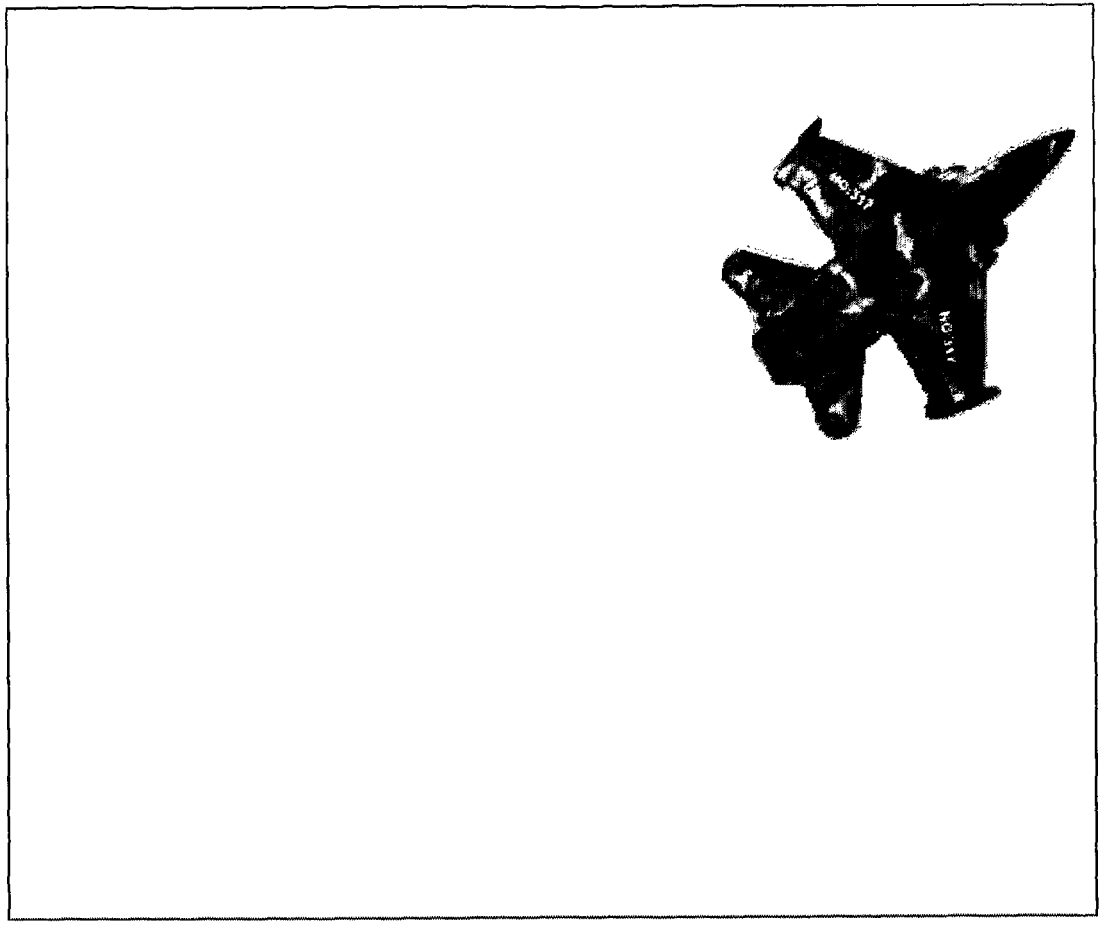
FIG. 6 is an image of an object after texture restoration, according to one of the embodiments.

In step 6 each of the objects identified in the previous step is separated from the others and processed separately. The process of separating a single object from the others is as follows: the pixels of the first object are converted back to the original values which they had in the original digital image source (FIG. 2a). All the pixels of the background and the other objects are given the same background value. The resulting image shows only the first object, depicted by its original pixel values, and a background of pixels having the same value as shown in FIG. 6. Each object is processed similarly resulting in n images. In one of the embodiments only after a specific object has been separated, thoroughly analyzed and classified by the system using steps 8-19, will the system return to the contrast image and continue separating and analyzing another object in the same fashion, until all objects have been separated and analyzed thoroughly. In another embodiment the system may separate and analyze more than one object simultaneously.

Figure 7:
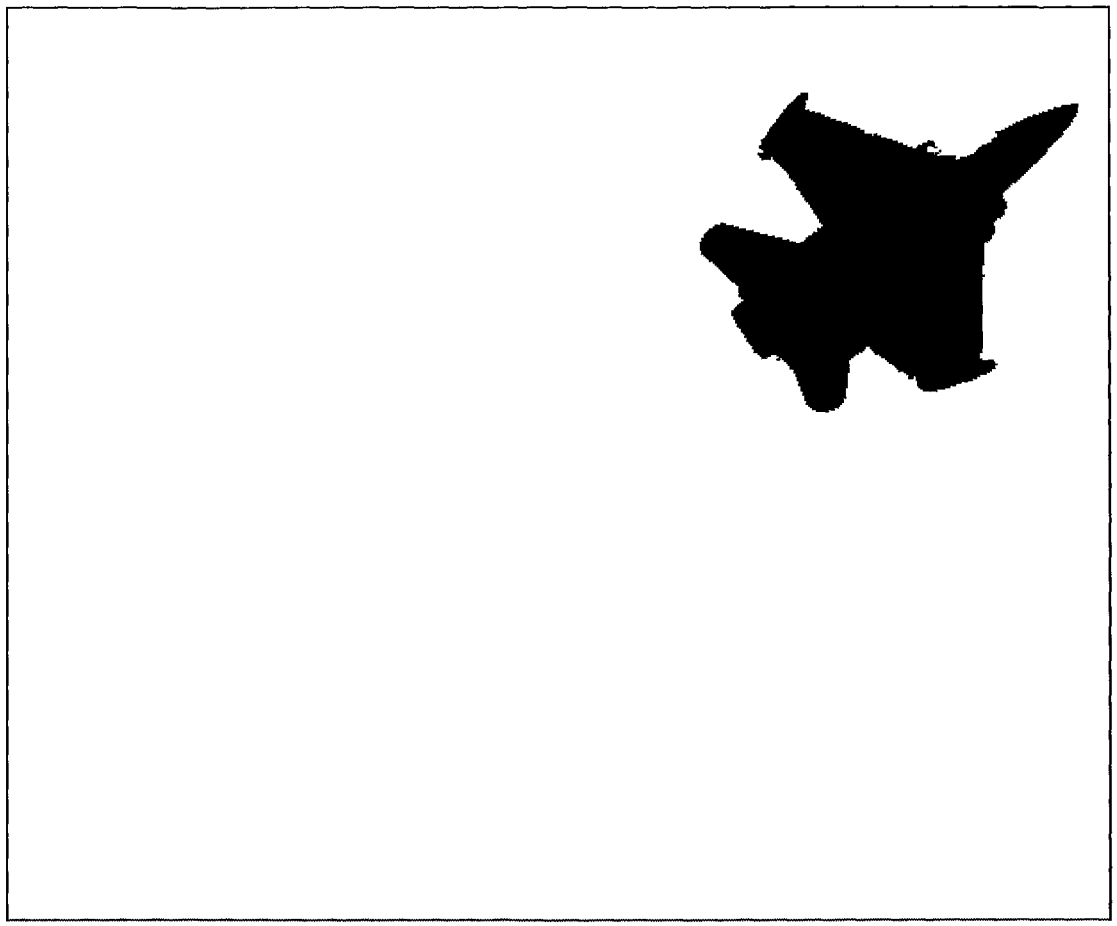
FIG. 7 is a black and white image of an object, according to one of the embodiments.

In step 7 a similar process to that of step 6 is carried out, with the exception that each object's pixels receive a uniform value different from the background value, instead of its original value. The resulting image is a one color object and a different color background, as shown in FIG. 7. As described before in the previous step the system continues to create one color images for every object in the original image (FIG. 2a).

The process may be carried further using either both images resulting from performing steps 6 and 7, or with the image resulting from performing either one of the steps for each object. Which types of images are used, depends upon the object's characteristics and the amount of information necessary to obtain the desired result. For example, when trying to classify objects of particular texture, the image with texture restoration of step 6 should be used for further processing. However, when classifying objects with particular geometrical characteristics, a black and white object image should be used for further processing.

The following steps, for the sake of brevity, describe the process for a single object. According to one of the embodiments, each object found in the new image provided after implementing steps 6 and/or 7, requires treatment by a similar process of performing steps 8-19.

In step 8 the geometrical characteristics such as length, width, circumference, etc. are extracted from the image (FIG. 6 or FIG. 7), by the processing of the image. For example, one of the image processing techniques involves reading the pixels of the image vector by vector, and storing the number of image pixels of each vector. Thus the length of the object is obtained, which is the largest number of image pixels in one vector. Another technique involves reading only the border pixels in the vector and storing the number of border pixels. Thus the circumference of the object is obtained. These characteristics may be used as individual parameters or their ratio may be used to define the object, such as the ratio between the length and the circumference.

Figure 8A:
FIG. 8a is a reduced resolution image of an object after texture restoration, according to one of the embodiments.
Figure 8B:
FIG. 8b is a black and white reduced resolution image of an object, according to one of the embodiments.

In step 9 the resolution of the image of FIG. 6 or 7, containing the object, may be reduced for faster analysis. It should be mentioned that the resolution may also be reduced in previous steps of the process. The resolution may be reduced according to a predetermined ratio, or in accordance with the complexity of the required results. Continuing the example, FIGS. 8a and 8b are reduced resolution images of FIGS. 6 and 7 respectively.

In step 10 the 2-dimensional pixel array that represents the new image provided after implementing steps 6 or 7, is transformed into a 1 dimensional vector. The transform, which uses erasing and shifting, begins by reading the pixels of the new image, pixel by pixel vector by vector. When an object pixel is reached (a different value from the background pixels) it is copied into the 1 dimensional vector, after which another object pixel is found and copied consecutively, and so on, until all the object pixels are copied into the vector consecutively. The result is a vector containing only the relevant information of the object, without the burdening information of the rest of the image. It should be mentioned that together with copying object pixels into the vector, some consecutive background pixels on the original vectors may be copied for additional information concerning the location of the copied pixels in the original image. This technique is especially helpful when dealing with two objects having the same texture and size but different shapes. Furthermore, a partial erasing is possible as well, wherein other parts of the image are copied to the vector in addition to the object pixels.

In step 11a 1-Dimensional Continuous Wavelet Transform (1D-CWT) is applied to the 1-D vector from step 10. The 1D-CWT transform produces coefficients as a function of scale (frequency) and shift (distance), containing significant information about the object.

Figure 9A:
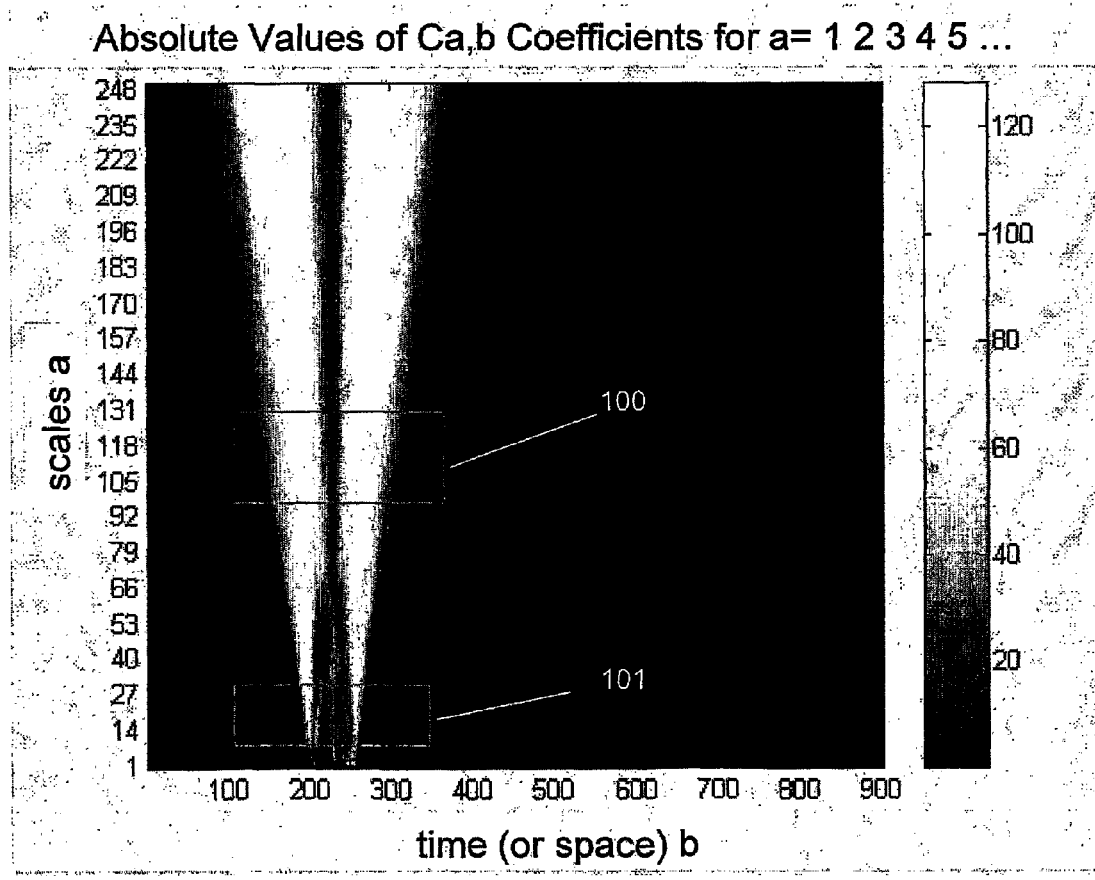
FIG. 9a is a visual simulation of the 1-Discrete Continuous Wavelet Transform applied on the vector containing object information, according to one of the embodiments.

FIG. 9a is a visual representation of the 1D-CWT applied to the 1-D vector obtained when applying steps 10 and 11 to FIG. 6 from the aircraft example discussed before. As may be understood, the visual representation of the 1D-CWT does not necessarily replicate the visual properties of the object itself. The purpose of the visual representation is to describe the features extracted from the transform; and may be depicted in many forms and colors. The gray scale to the right of the image is a comparison key showing the value of the coefficients as represented in FIG. 9a.

Figure 9B:
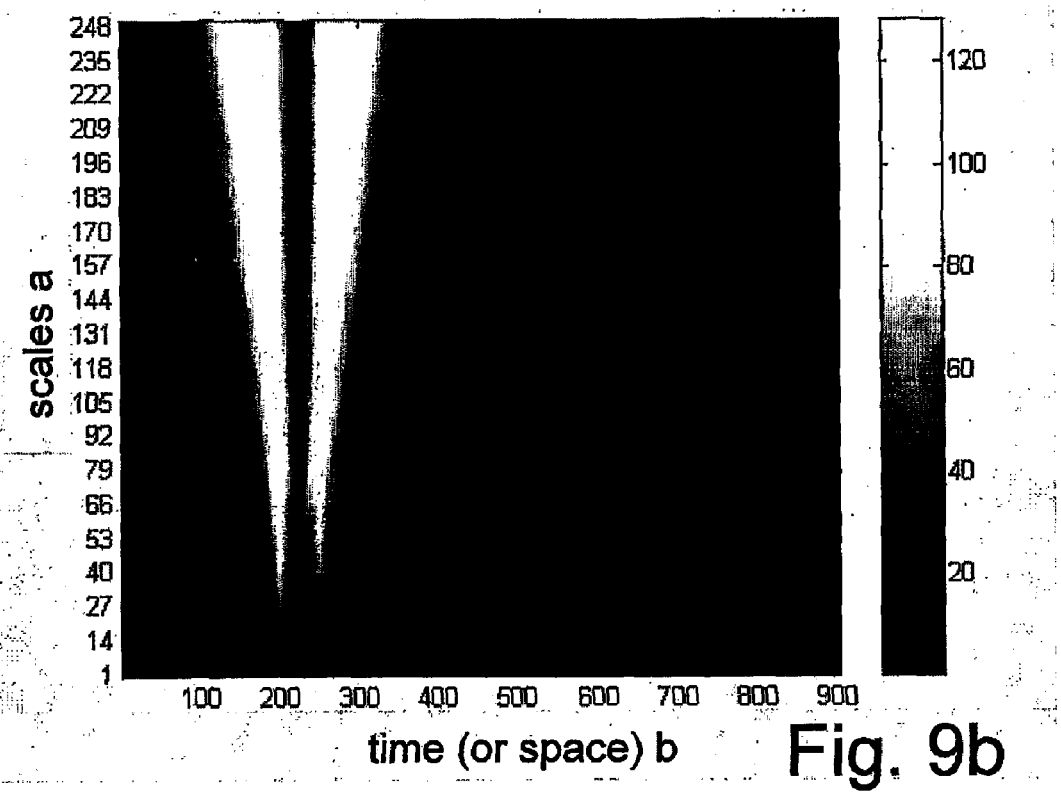
FIG. 9b is a visual simulation of the 1-Discrete Continuous Wavelet Transform applied on the vector containing another object information, according to one of the embodiments.
Figure 9C:
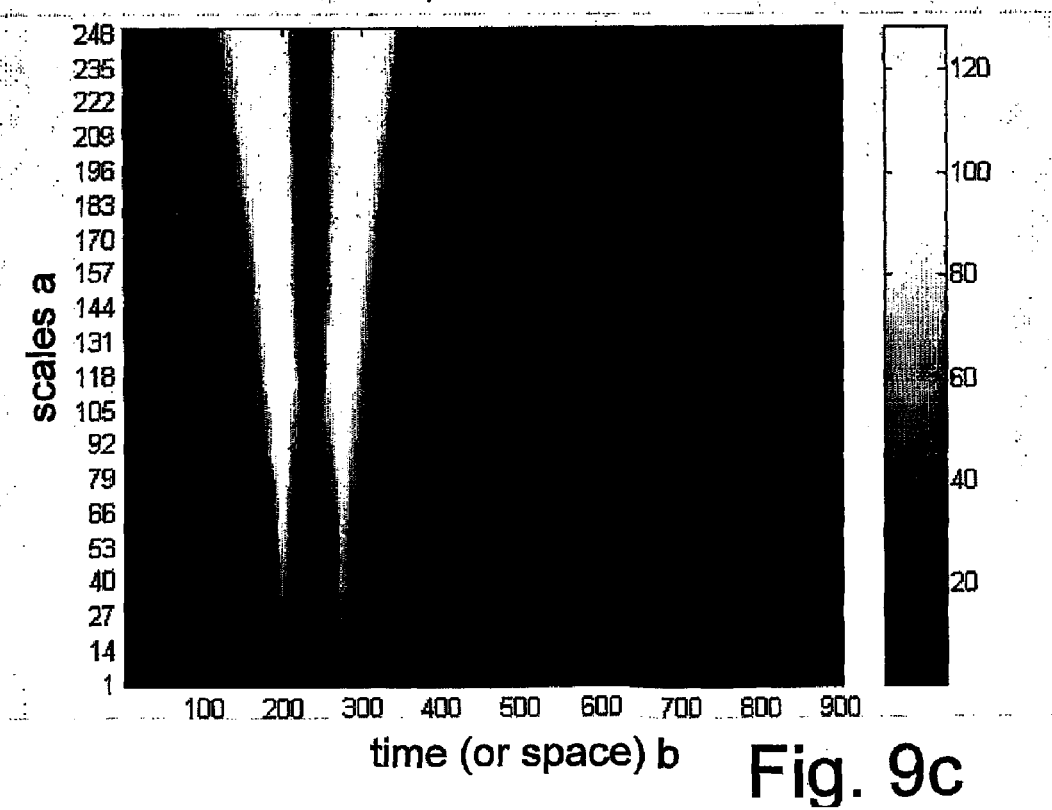
FIG. 9c is a visual simulation of the 1-Discrete Continuous Wavelet Transform applied on the vector containing another object information, according to one of the embodiments.

In steps 12 and 13 the 1-D graph of coefficients obtained in step 11 is processed to obtain distinct parameters of the object. For example: finding in which scale the maximum coefficient is located and finding its value. In another example: finding the maximum and minimum in a certain scale. All these scale values and coefficient values are extracted to define the object and classify it. The sought after parameters differ for different objects. In FIG. 9a, an example window 100 shows the location of the brightest factors, meaning the maximum coefficients of the transform (around scale 110). Another example for deriving features is shown by window 101 which shows many variations of maximum and minimum coefficients (around scale 14). All these distinct parameters are extracted for comparison with the parameters stored in the database used for ANN learning. FIGS. 9b and 9c illustrate other visualizations of 1D-CWT of other objects. As may be seen by FIG. 9a to 9c the location of the maximum coefficients differs from object to object, as well as the location of other features.

In step 14 the scale values and coefficient values are combined with the geometrical characteristics extracted in step 8 to form a feature vector which distinctly defines the object. For example, a feature vector may comprise the following characteristics: length, width, area, circumference, maximum scale, minimum scale, scale where highest number of variations from maximum to minimum is found, maximum coefficient, minimum coefficient, a coefficient relevant to a specific scale. The feature vector consists of three parts. One of the parts contains the geometrical characteristics, the second part contains the scale values, and the third part contains the coefficient values. All the feature vectors are consistent, meaning that the features of the same category receive the same placement in the vector. For example, the value of the circumference may be the first value in the vector. The feature vector acts as a "finger print" or unique characteristic of the object and is used to detect and classify the object, meaning that similar objects have similar feature vectors and dissimilar objects have different feature vectors. Being the essence of the invention, the feature vector allows simple comparison between objects instead of full image comparison used in prior arts. The feature vector allows the system to define the object in simple parameters and deduce by comparison the classification of the objects. The simplicity allows real time processing of relatively weak computation resources in low resolution environments. Furthermore, the feature vector can be deduced from low quality (i.e. resolution) images.

In step 15 the Artificial Neural Network (ANN) is supplied with the feature vector, found in the previous step, for comparison. As described above, the ANN is capable of making automatic decisions based on pre inserted data and training. The pre inserted data in one of the embodiments is a set of feature vectors of different objects. Each of the feature vectors serves as a "finger print" of the respective object. The ANN's main task is adjusting the weight of the characteristics of each class of objects, by learning from multiple examples. For example, if the ANN is given a number of feature vectors all belonging to different cars; it is assumed that the color factor receives a lesser weight in contrast to the shape factor, as cars may vary extremely in colors but not in shape. In another example, the ANN is fed with multiple images of trees which may cause the ANN to give a higher weight to the color factor in this class of objects. Step 15 may be used for further training of the system to upgrade the existing database with more examples of feature vectors belonging to objects of the same class.

Although step 16 and the following steps are not necessary for implementing the invention, their significance is apparent for describing an embodiment allowing for error corrections and method modifications.

Step 16 is a performance control of the system for evaluating the overall success of the method. In case the system successfully detected the object in the image and classified it correctly, step 18 (i.e. success) leads to step 19 which is the end of the process. On the other hand, if the operator finds that the system did not detect the object or classified the object incorrectly, or detected the wrong object, step 17 (i.e. Failure) leads to back propagation in the method. Back propagation allows the system to modify some of the derived features selected in the previous steps. Although FIG. 1a illustrates a back propagation to step 8, many other back propagations are possible to other steps, all in accordance with the requirements of the user, system, or objects. For example, changing the class of wavelet chosen in step 2 is possible, or adjusting the feature vector of the selected objects, etc.

Figure 10:
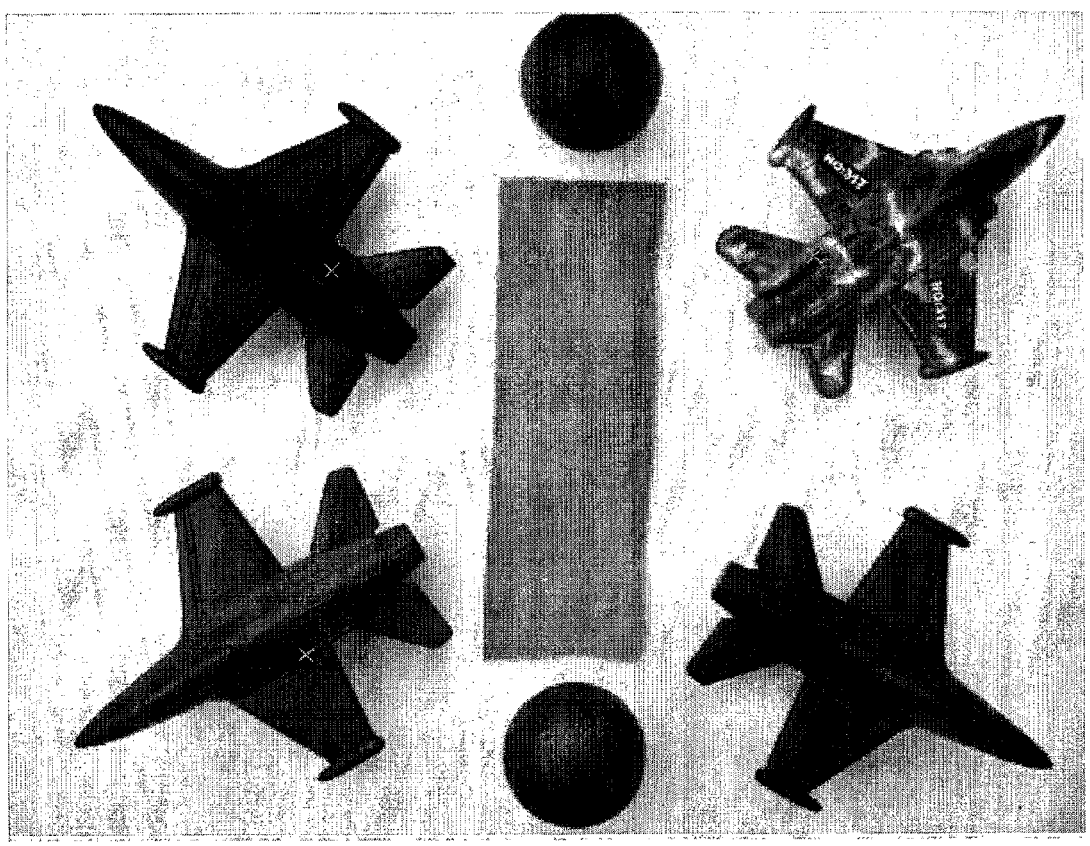
FIG. 10 is a general example of results achieved by the invention.

FIG. 10 illustrates a successful outcome of the process applied to the example used herein to illustrate the invention. The ANN was asked to compare all the objects found in the image source. In case of successful recognition, the objects belonging to the aircraft class are marked, for example, with a white cross. As shown FIG. 10 all 4 aircraft have been detected, classified correctly, and marked, while the other objects (two balls and a rectangle) are not marked.

Figure 11:
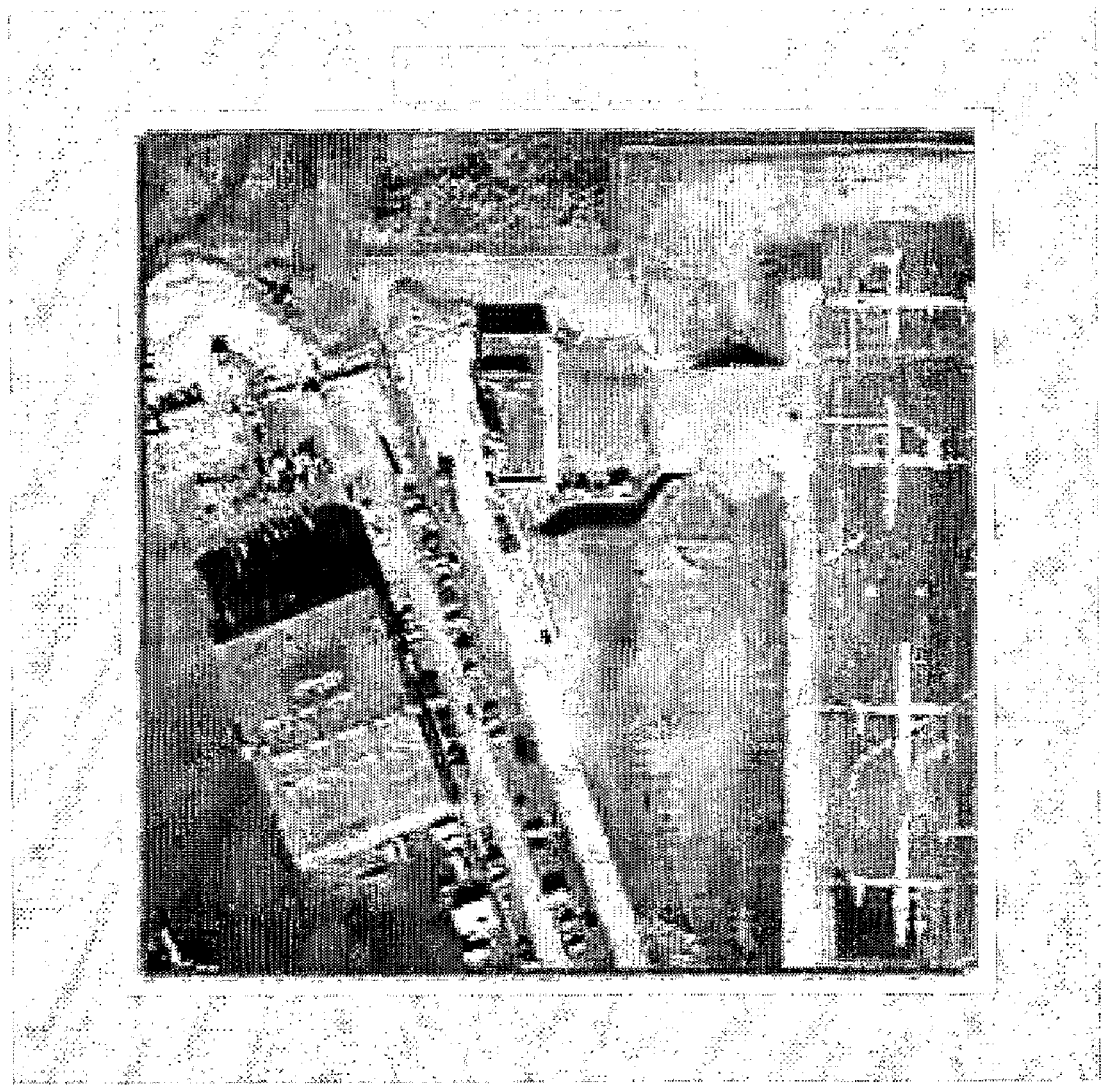
FIG. 11 is a general example of another source image in one of the embodiments.
Figure 12A:
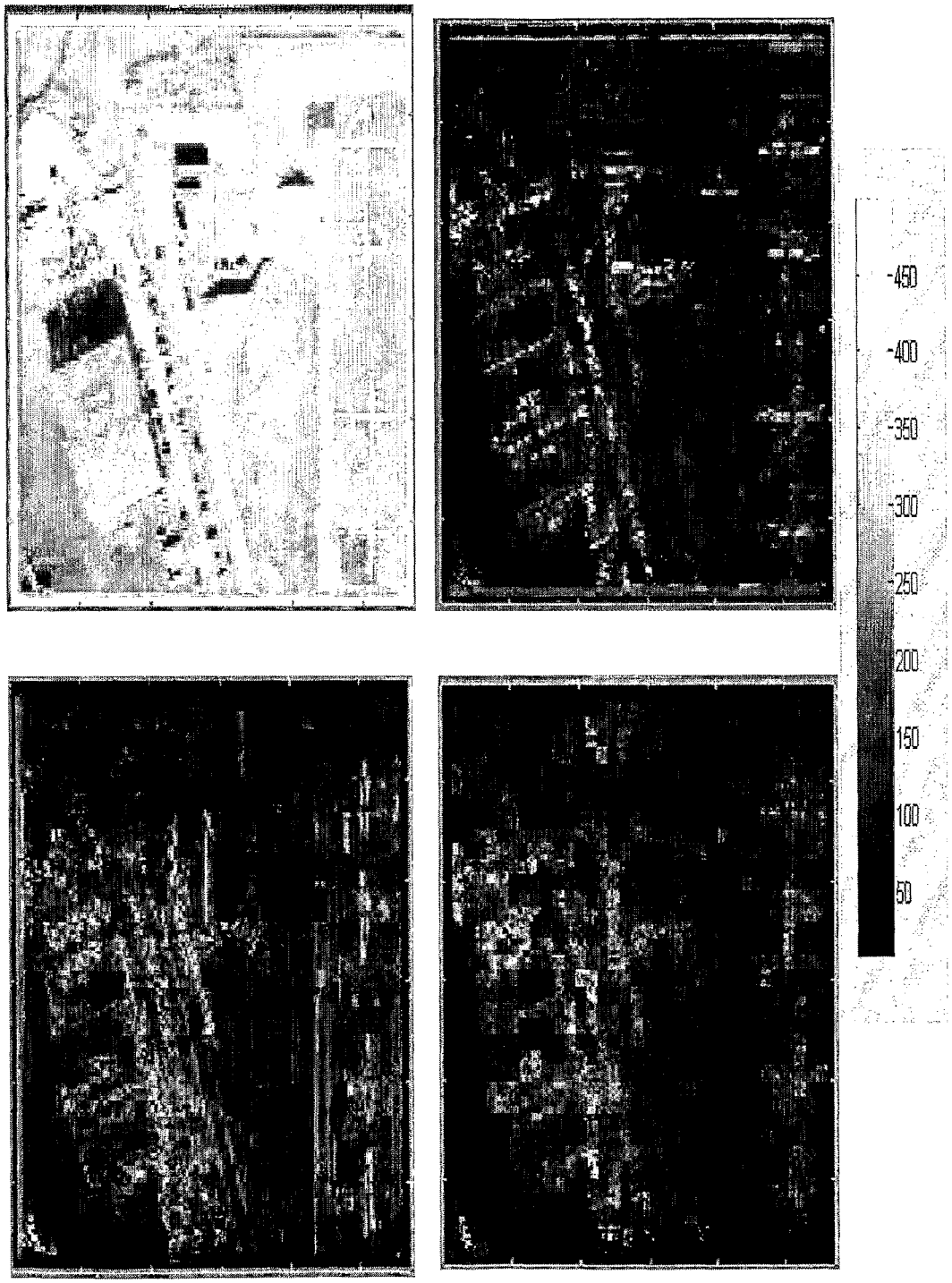
FIG. 12a is a visual representation of approximation coefficients and detail coefficients (vertical, horizontal and diagonal) derived from a 2-D Discreet Wavelet Transform performed on source image, according to one of the embodiments.
Figure 12B:
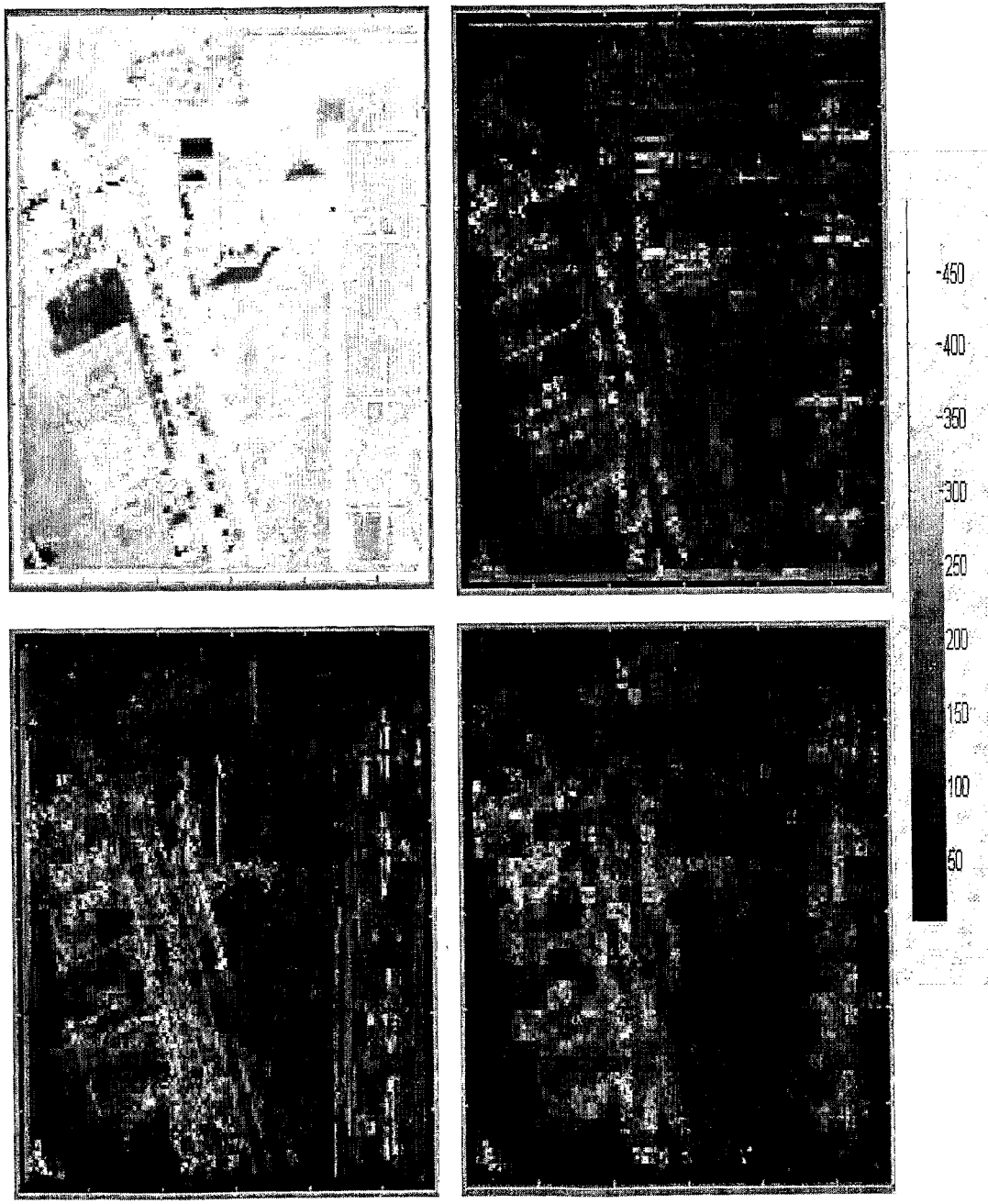
FIG. 12b is a visual representation of a reconstruction from 2D Discreet Wavelet Transform 2 level approximation coefficients and detail coefficients derived from a 2-D Discreet Wavelet Transform performed on source image, according to one of the embodiments.
Figure 13:
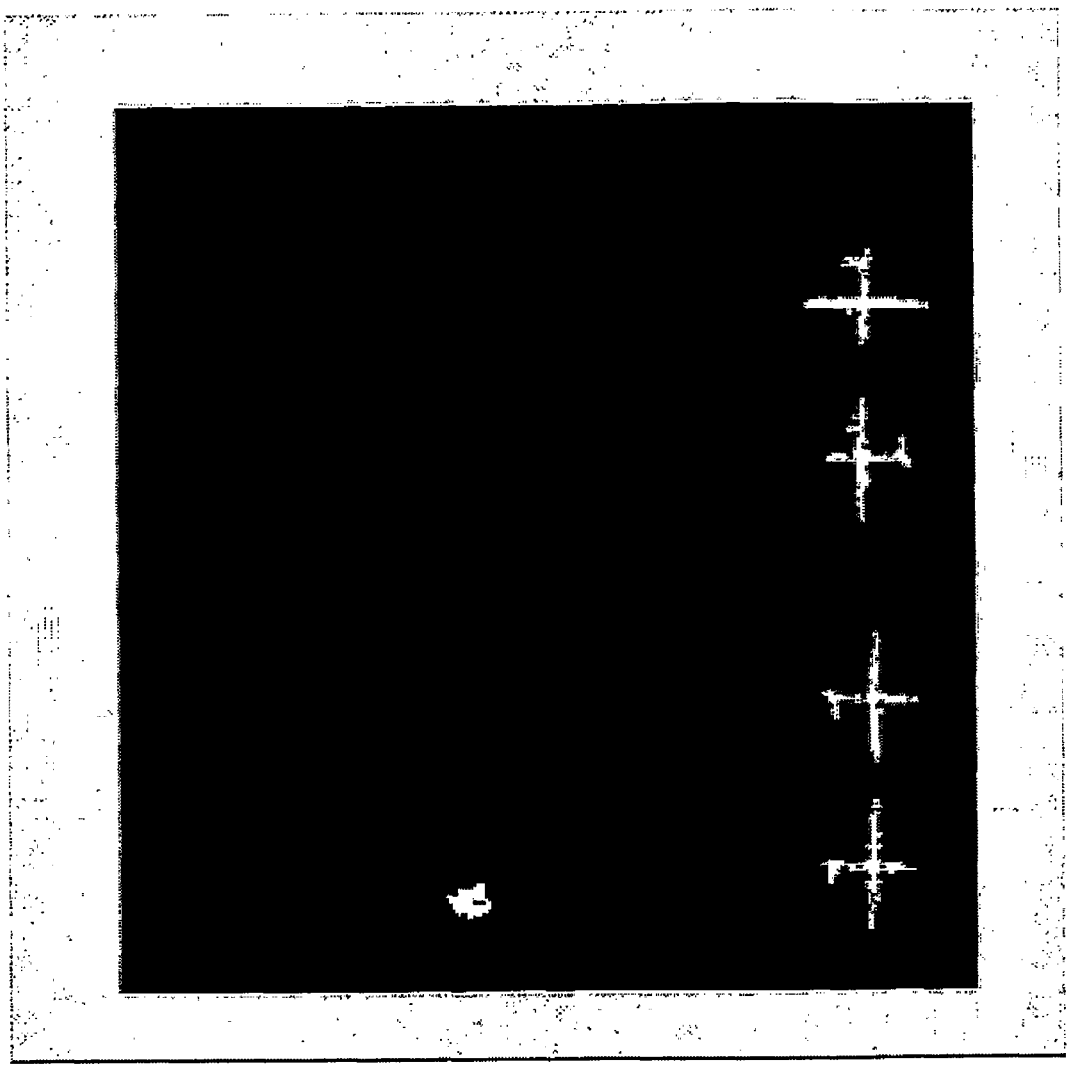
FIG. 13 illustrates a contrast image, processed from source image, according to one of the embodiments.

FIG. 11 illustrates another example of airplane objects in an image. As shown in the image, 4 planes are parked at the right side of the image and other objects, buildings, etc. are scattered in different locations. A 2D-DWT is applied to the vectors of the image and the approximation and detail coefficients and their reconstruction are visually illustrated in FIGS. 12a and 12b respectively. In FIG. 12a the top left image visually represents the approximation coefficients, the top right image visually represents the horizontal detail coefficients, the bottom left image visually represents the vertical detail coefficients, and the bottom right image visually represents the diagonal detail coefficients. FIG. 12b, the top left image visually represents the reconstruction of the approximation coefficients, the top right image visually represents the reconstruction of the horizontal detail coefficients, the bottom left image visually represents the reconstruction of the vertical detail coefficients, and the bottom right image visually represents the reconstruction of the diagonal detail coefficients. As described hereinabove in the previous example, coefficients are extracted and reconstructed if necessary for defining object's edges and detecting objects. FIG. 13 illustrates how the 4 planes are depicted in the contrast image, described previously in step 4. In addition, a building is also depicted as an object, at the lower part of the image, in order to show the clear difference between the building characteristics and the planes characteristics.

Figure 14:
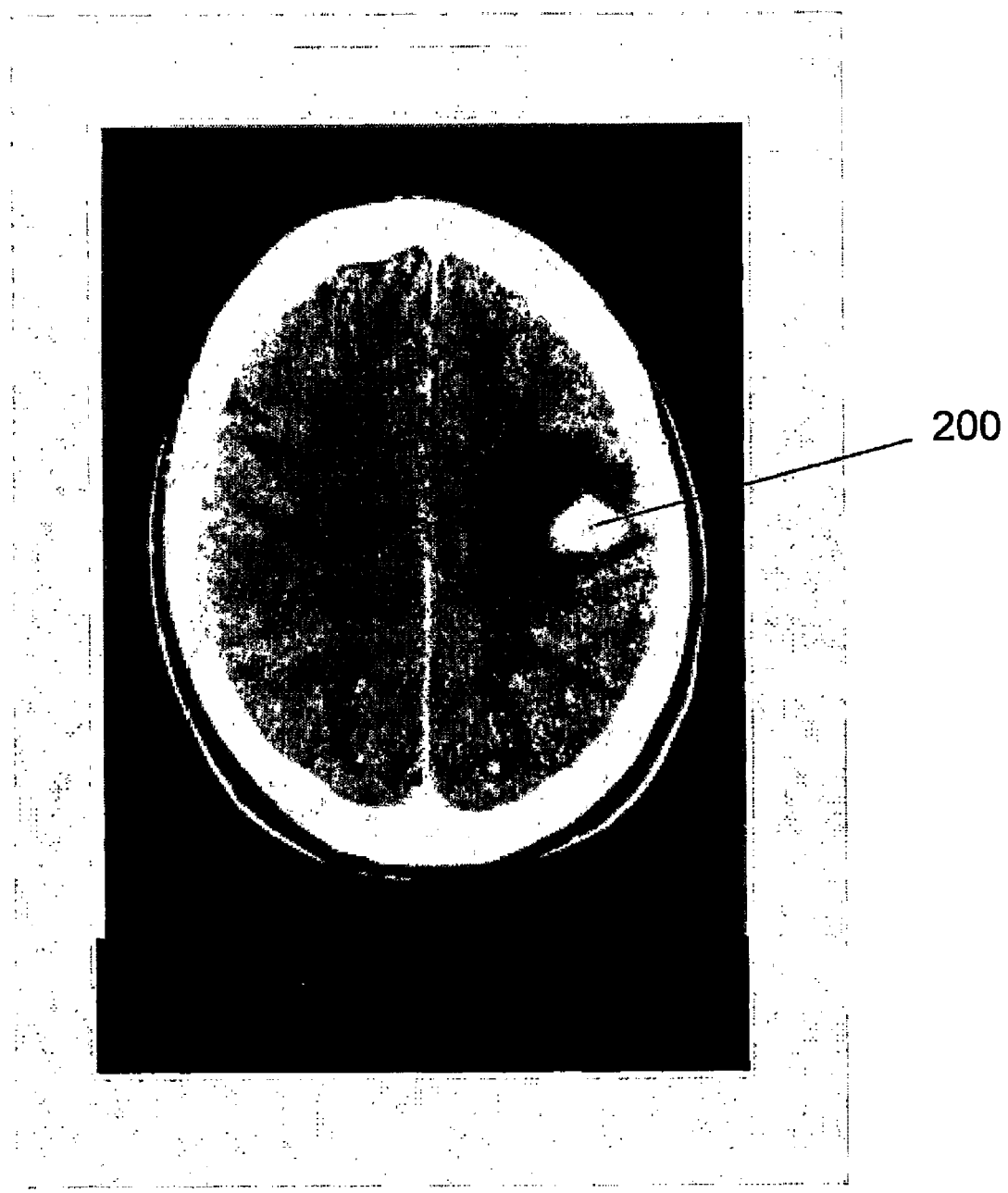
FIG. 14 is a general example of another source image in one of the embodiments.
Figure 15A:
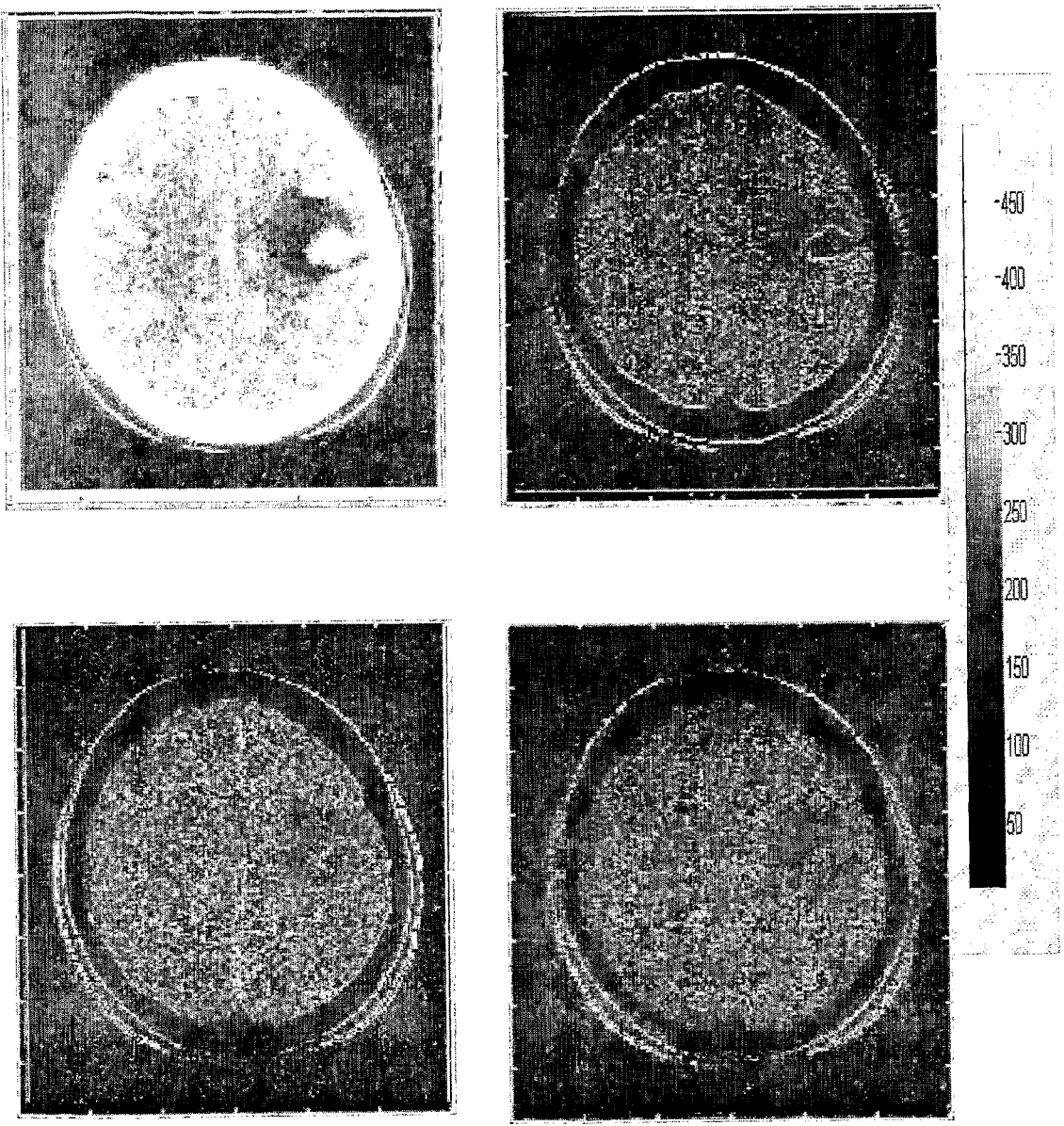
FIG. 15a is a visual representation of approximation coefficients and detail coefficients (vertical, horizontal and diagonal) derived from a 2-D Discreet Wavelet Transform performed on source image, according to one of the embodiments.
Figure 15B:
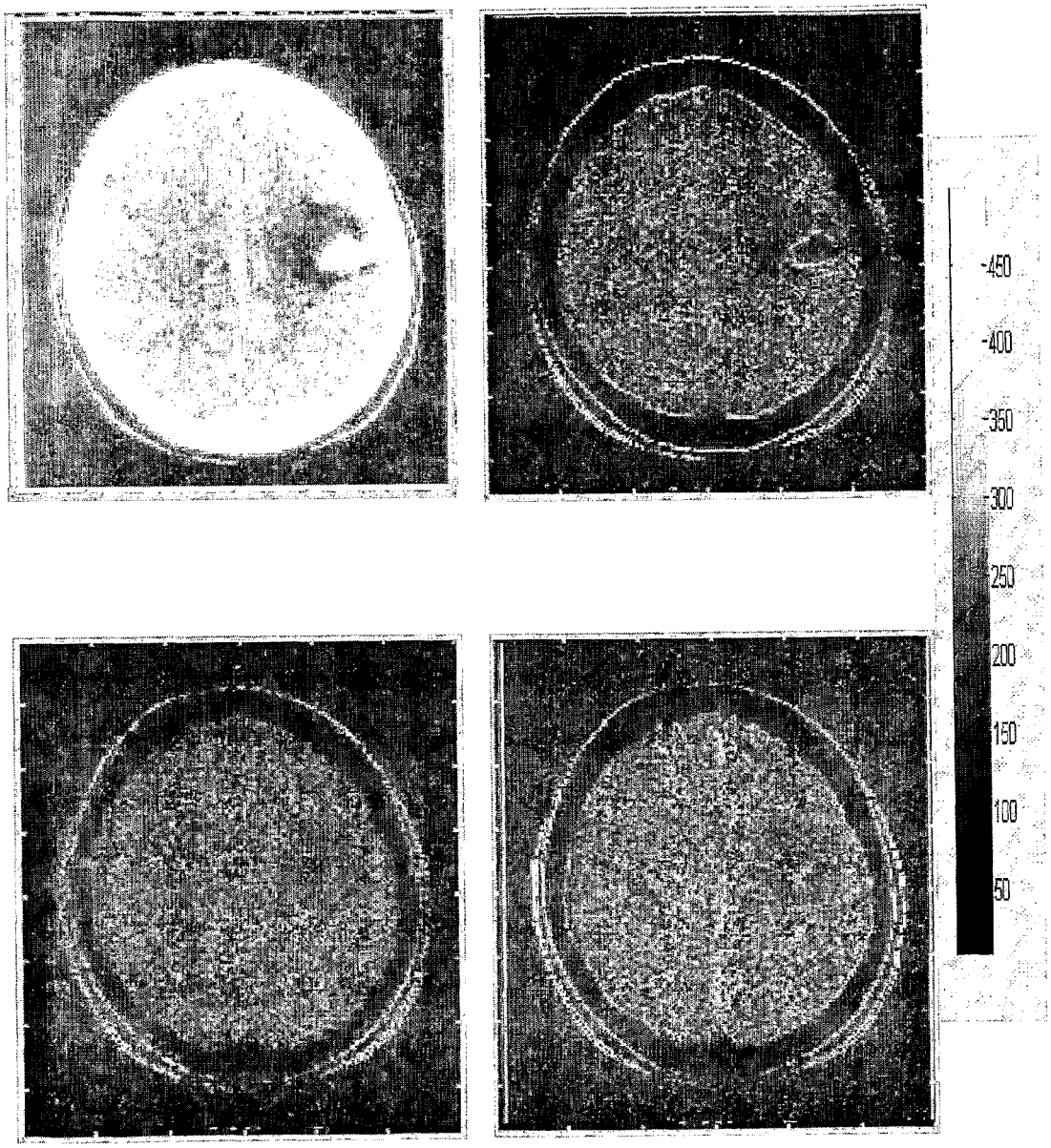
FIG. 15b is a visual representation of a reconstruction from 2D Discreet Wavelet Transform 2 level approximation coefficients and detail coefficients derived from a 2-D Discreet Wavelet Transform performed on source image, according to one of the embodiments.
Figure 16A:
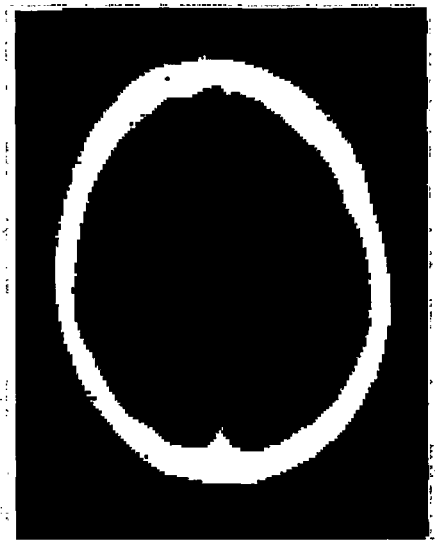
FIG. 16a is a black and white image of an object successfully separated from the source image, according to one of the embodiments.
Figure 16B:
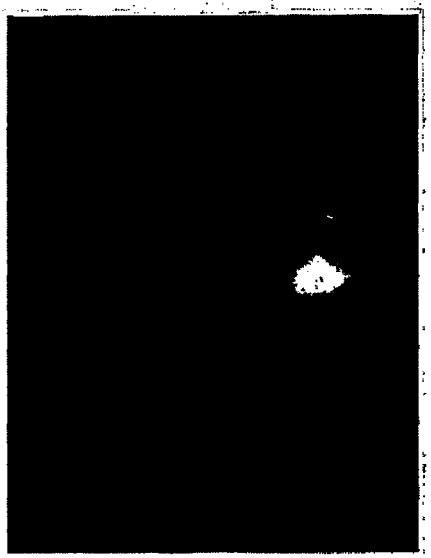
FIG. 16b is a black and white image of another object successfully separated from the source image, according to one of the embodiments.

FIG. 14 illustrates an example for the use of the method in a medical application. In FIG. 14 a CT scan is shown where a tumor 200 exists in the right part of the brain. As stated before, the invention is capable of detecting and classifying objects that do not have an explicit shape but can be recognized by their unique texture. FIGS. 15a and 15b show a visual illustration of the coefficients derived from the 2D-DWT applied to the image of FIG. 14 and their reconstruction. In FIG. 15a the top left image visually represents the approximation coefficients, the top right image visually represents the horizontal detail coefficients, the bottom left image visually represents the vertical detail coefficients, and the bottom right image visually represents the diagonal detail coefficients. FIG. 15b, the top left image visually represents the reconstruction of the approximation coefficients, the top right image visually represents the reconstruction of the horizontal detail coefficients, the bottom left image visually represents the reconstruction of the diagonal detail coefficients, and the bottom right image visually represents the reconstruction of the vertical detail coefficients. As shown in FIG. 16a the skull has been successfully recognized as an individual object. FIG. 16b illustrates the image created after object separation (steps 2-7) where the tumor has been successfully identified as a different object separate from the skull at the end of the process.

Figure 17:
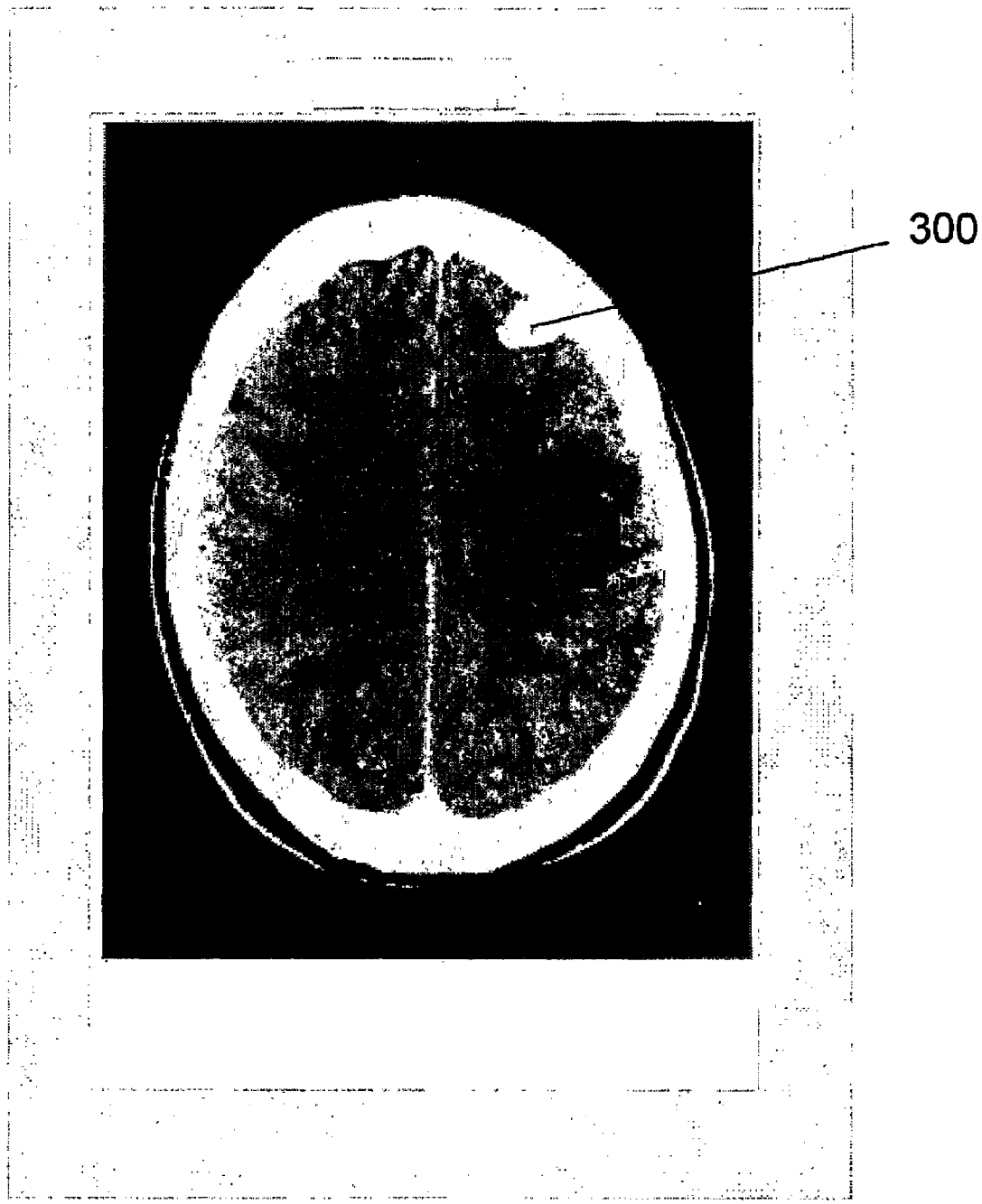
FIG. 17 is a general example of another source image in one of the embodiments.
Figure 18A:
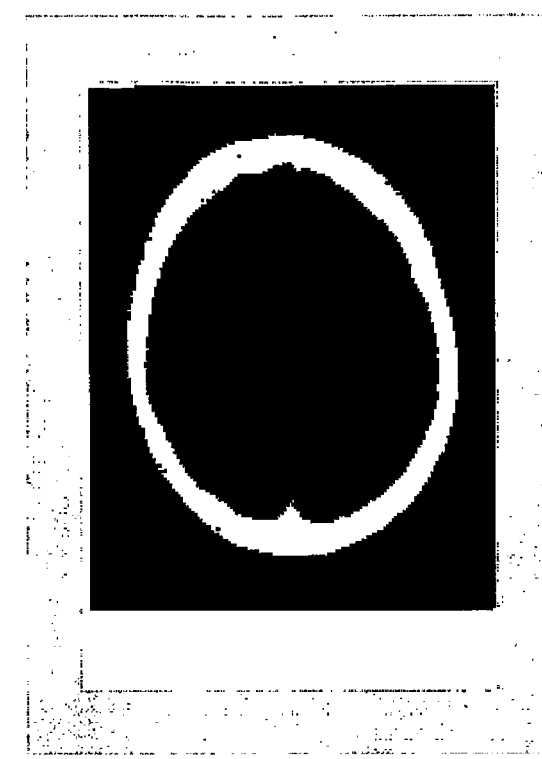
FIG. 18a is a black and white image of an object successfully separated from the source image, according to one of the embodiments.
Figure 18B:
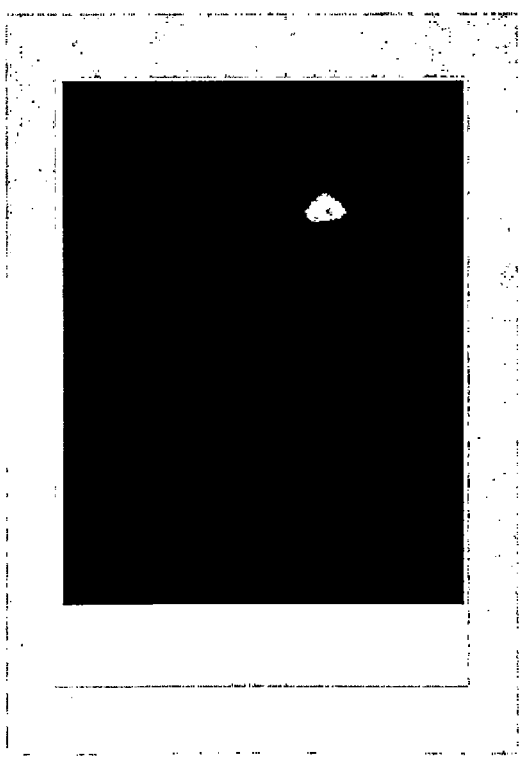
FIG. 18b is a black and white image of another object successfully separated from the source image, according to one of the embodiments.

FIG. 17 illustrates another example of a tumor 300 in a brain which is located close to the skull and similar in color and shade. The same process as described before is applied, and as shown in FIGS. 18a and 18b, the skull and the tumor have been separated as different objects.

It should be noted that the process steps may be carried out manually, digitally or as a combination of both.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method of automatically detecting and classifying objects, the method comprising:
   a. providing an original image comprising one or more objects;
   b. creating a new image of each of said objects isolated from all other objects of said original image by performing a process of image separation;
   c. extracting geometrical characteristics of the object from the new image, and storing them in a feature vector;
   d. transforming at least one of said new images of said isolated object into a vector using at least one of erasing and shifting, wherein said transforming comprises reading the pixels of the new image vector by vector, where said vector contains information of said isolated object, and said vector comprises at least one consecutive background pixel for each vector of the at least one new image;
   e. applying a 1 Dimensional Continuous Wavelet Transform to said vector;
   f. extracting from said 1 Dimensional Continuous Wavelet Transform, both the scale, and coefficient values of said isolated object and storing said extracted values in said feature vector;
   g. comparing said feature vector to at least one other feature vector from a data base; and
   h. classifying each of said one or more objects responsive to said comparing of said feature vector.

2. A method according to claim 1, wherein the performed process of image separation comprises:
   a. applying a 2 Dimensional Discrete Wavelet Transform to the original image;
   b. detecting edges of at least one of the objects or providing a threshold to detect at least one of the objects;
   c. producing a contrast image responsive to said detected edges or said provided threshold, wherein pixels of the at least one object have a different value from background pixels;

d. refining said contrast image by eliminating isolated pixels; and e. assigning an individual value to each of the at least one object, where said pixels of the at least one object are assigned said individual value; and f. producing a new image for each of the at least one object containing said pixels of the at least one object and background pixels.

3. A method according to claim 1, further comprising the step of: reducing the resolution of the created new image.

4. A method according to claim 2, where the applied 2 Dimensional Discrete Wavelet Transform derives one of the approximation coefficient matrix obtained by the wavelet decomposition of the original image and the reconstruction matrix of said coefficients.

5. A method according to claim 2, where the 2 Dimensional Discrete Wavelet Transform derives one of the approximation coefficients matrix, the detail coefficient matrixes of the original image and the reconstruction matrixes of said coefficients.

6. A method according to claim 2, where the 2 Dimensional Discrete Wavelet Transform derives one of the vertical detail coefficients matrix of the original image and the reconstruction matrix of said coefficients.

7. A method according to claim 2, where the 2 Dimensional Discrete Wavelet Transform derives one of the horizontal detail coefficients matrix of the original image and the reconstruction matrix of said coefficients.

8. A method according to claim 2, where the 2 Dimensional Discrete Wavelet Transform derives one of the diagonal detail coefficients matrix of the original image and the reconstruction matrix of said coefficients.

9. A method according to claim 2, where the 2 Dimensional Discrete Wavelet Transform is applied in "slices" to a multi dimensional original image.

10. A method according to claim 2, where said produced new image contains the original object pixels from the original image.

11. A method according to claim 2, where pixels of all of the at least one object of said produced new image are assigned the same value.

12. A method according to claim 1, where the object is a pattern in an image.

13. A method according to claim 1, where the provided original image is a 2 dimensional image.

14. A method according to claim 1, where the provided original image has more than 2 dimensions.

15. A method according to claim 1, where the extracted features are wavelet scale values.

16. A method according to claim 1, where the extracted features are wavelet coefficients.

17. A method according to claim 1, where the information of said extracted at least one feature comprises at least one of: a scale in which the maximum or minimum coefficient is located; a value of the maximum coefficient; and a value of the minimum coefficient.

18. A method according to claim 1, where the Wavelet used in the applied 1 Dimensional Continuous Wavelet Transform may belong to any one of the known Mother Wavelets.

19. A method according to claim 1, where the Wavelet used in the applied 1 Dimensional Continuous Wavelet Transform may be a newly created Mother Wavelet.

20. A method according to claim 1, where the transforming is accomplished by a partial rearrangement.

21. A method according to claim 1, where the comparing of the feature vector to at least one other feature vector is done by an Artificial Neural Network.

* * * * *